US012623259B2

(12) United States Patent
Wang et al.

(10) Patent No.: US 12,623,259 B2
(45) Date of Patent: May 12, 2026

(54) METHODS AND DEVICES FOR CLEANING DUST FROM A SURFACE

(71) Applicants: The Regents of the University of Colorado, Denver, CO (US); California Institute of Technology, Pasadena, CA (US); University of Iowa Research Foundation, Iowa City, IA (US)

(72) Inventors: Xu Wang, Superior, CO (US); Mihaly Horanyi, Boulder, CO (US); Benjamin Farr, Boulder, CO (US); Inseob Hahn, Glendale, CA (US); Ulf Israelsson, Altadena, CA (US); John Goree, Iowa City, IA (US)

(73) Assignees: The Regents of the University of Colorado, Denver, CO (US); California Institute of Technology, Pasadena, CA (US); University of Iowa Research Foundation, Iowa City, IA (US)

( * ) Notice: Subject to any disclaimer, the term of this patent is extended or adjusted under 35 U.S.C. 154(b) by 785 days.

(21) Appl. No.: 17/881,880

(22) Filed: Aug. 5, 2022

(65) Prior Publication Data

US 2023/0043866 A1 Feb. 9, 2023

Related U.S. Application Data

(60) Provisional application No. 63/230,265, filed on Aug. 6, 2021.

(51) Int. Cl.
*B08B 6/00* (2006.01)

(52) U.S. Cl.
CPC .................................... *B08B 6/00* (2013.01)

(58) Field of Classification Search
None
See application file for complete search history.

(56) References Cited

U.S. PATENT DOCUMENTS 5,125,124 A * 6/1992 Saeki .................... C23C 14/022 15/1.51
5,516,369 A * 5/1996 Lur ....................... B08B 7/0035 15/1.51
6,371,135 B1 * 4/2002 Ryskoski .................. B08B 6/00 134/1

FOREIGN PATENT DOCUMENTS

CA 2008765 A1 * 8/1990 ........... C23C 14/564

OTHER PUBLICATIONS

Winterhalter et al. Lunar Dust and Its Impact on Human Exploration: A NASA Engineering and Safety Center (NESC) Workshop. Sep. 2020, NASA/TM-2020-5008219, NESC-RP-19-01469.

(Continued)

*Primary Examiner* — Kaj K Olsen
*Assistant Examiner* — Arlyn I Rivera-Cordero
(74) *Attorney, Agent, or Firm* — Meunier Carlin & Curfman LLC

(57) ABSTRACT

Disclosed herein are methods and devices for cleaning a surface of a substrate having a layer of dust disposed thereon by ejecting at least a portion of the dust from the surface. The methods comprise irradiating the layer of dust with an electron beam, such that the electron beam irradiates a particle thereby inducing said particle to emit a plurality of secondary electrons; wherein at least a portion of the plurality of secondary electrons impinge two or more neighboring particles to thereby generate a secondary charge on the two or more neighboring particles, wherein the secondary charge on the two or more neighboring particles creates an electrostatic repulsive force between said particles, (Continued)

wherein the electrostatic repulsive force is sufficient to eject said particles from the surface.

20 Claims, 19 Drawing Sheets

(56) References Cited

OTHER PUBLICATIONS

Stubbs, Timothy J., Richard R. Vondrak, and William M. Farrell. “Impact of dust on lunar exploration.” URL: http://hefd. jsc. nasa. ov/files/StubbsImpactOnExploration 4075 (2007), 6 Pages.
N Afshar-Mohajer et al. Review of dust transport and mitigation technologies in lunar and Martian atmospheres, Adv. Space Res. 56 (2015) 1222-1241.
TE Sheridan et al. Observation of dust shedding from material bodies in a plasma, J. Geophys. Res. 97 (1992) 2935, 8 Pages.
TM Flanagan et al. Dust release from surfaces exposed to plasma, Phys. Plasmas 13 (2006) 123504, 11 Pages.
CM Ticoş et al. Experimental demonstration of Martian soil simulant removal from a surface using a pulsed plasma jet, Rev. Sci. Instrum. 86 (2015) 33509.
GS Selwyn et al. In situ laser diagnostic studies of plasma-generated particulate contamination, J. Vac. Sci. Technol., A 7 (1989) 2758-2765.
A Yu Pigarov et al. Dust-particle transport in tokamak edge plasmas, Phys. Plasmas 12 (2005) 122508, 5 Pages.
M Horanyi. Charged dust dynamics in the solar system, Annu. Rev. Astron, Astrophys. Nor. 34 (1996) 383-418.
X Wang et al. Investigation of dust transport on the lunar surface in a laboratory plasma with an electron beam, J. Geophys. Res. 115 (2010) A11102, 6 Pages.
TE Sheridan et al. Charge fluctuations for particles on a surface exposed to plasma, Appl. Phys. Lett. 98 (2011) 91501, 9 Pages.
LCJ Heijmans et al. Dust on a surface in a plasma: a charge simulation, Phys. Plasmas 23 (2016) 43703, 12 Pages.
X Wang et al. Dust charging and transport on airless planetary bodies, Geophys. Res. Lett. 43 (2016) 6103-6110.
J Schwan et al. The charge state of electrostatically transported dust on regolith surfaces, Geophys. Res. Lett. 44 (2017) 3059-3065.
N Hood et al. Laboratory investigation of rate of electrostatic dust lofting over time on airless planetary bodies, Geophys. Res. Lett. 45 (2018) 13, 206-13, 212.
A Dove et al. Laboratory investigation of the effect of surface roughness on photoemission from surfaces in space, Planet. Space Sci. 156 (2018) 92-95.
NC Orger et al. Experimental investigation on silica dust lofting due to charging within micro-cavities and surface electric field in the vacuum chamber, Adv. Space Res. 63 (2019) 3270-3288.
MI Zimmerman et al. Grain-scale supercharging and breakdown on airless regoliths, J. Geophys. Res. Planets 121 (2016) 2150-2165.
X Wang et al. Plasma potential in the sheaths of electron-emitting surfaces in space, Geophys. Res. Lett. 43 (2016) 525-531.
EC Whipple. Potentials of surfaces in space, Rep. Prog. Phys. 44 (1981) 1197-1250.
A Carroll et al. Laboratory measurements of initial launch velocities of electrostatically lofted dust on airless planetary bodies, Icarus 352 (2020) 113972, 7 Pages.
NC Orger et al. Experimental investigation on particle size and launch angle distribution of lofted dust particles by electrostatic forces, Advances in Space Research 68 (2021) 1568-1581.
CM Hartzell et al. Experimental demonstration of the role of cohesion in electrostatic dust lofting, Geophysical research letters 40 (2013) 1038-1042.
B Guo et al. Electrodynamic dust shield performance under simulated operating conditions for solar energy applications, Solar Energy Materials and Solar Cells 185 (2018) 80-85.
H Kawamoto, Electrostatic cleaning equipment for dust removal from soiled solar panels, J. Electrostatics 98 (2019) 11-16.
H Kawamoto, Electrostatic Cleaning Device for Removing Lunar Dust Adhered to Spacesuits, J. Aerosp. Eng. 25 (2012) 470-473.

* cited by examiner

METHODS AND DEVICES FOR CLEANING DUST FROM A SURFACE

CROSS-REFERENCE TO RELATED APPLICATIONS

This application claims the benefit of priority to U.S. Provisional Application No. 63/230,265 filed Aug. 6, 2021, which is hereby incorporated herein by reference in its entirety.

STATEMENT OF GOVERNMENT SUPPORT

This invention was made with government support under Grant No. 80NM00018D0004 awarded by NASA (JPL). The government has certain rights in the invention.

BACKGROUND

Several dust mitigation technologies have been investigated over the past years, but they all have disadvantages. Improved dust mitigation technologies are needed. The methods and devices discussed herein address this and other needs.

SUMMARY

In accordance with the purposes of the disclosed methods and devices as embodied and broadly described herein, the disclosed subject matter relates to methods and devices for cleaning a surface of a substrate having a layer of dust disposed thereon by ejecting at least a portion of the dust from the surface.

For example, disclosed herein are methods of cleaning a surface of a substrate having a layer of dust disposed thereon, the methods comprising irradiating a first location of the layer of dust with an electron beam; wherein the layer of dust comprises a plurality of particles; wherein the plurality of particles have an average particle size; wherein the layer of dust has an average thickness that is from 1 to 40 times the average particle size; wherein each of the plurality of particles has a balance of forces, the balance of forces comprising a cohesive force between neighboring particles (e.g., a particle-particle cohesive force), an adhesive force between each particle and the surface (e.g., a particle-surface adhesive force), a gravitational force, or a combination thereof; wherein the layer of dust further comprises a first cavity defined by a first portion of the plurality of particles, said first portion of the plurality of particles comprising 3 or more particles; wherein the first location includes the first cavity, such that the electron beam traverses at least a portion of the first cavity to irradiate a particle within the first portion of the particles, said particle being an irradiated particle; thereby inducing the irradiated particle to emit a plurality of secondary electrons; wherein at least a portion of the plurality of secondary electrons traverse at least a portion of the first cavity and impinge two or more of the other particles within the first portion of particles to thereby generate a secondary charge on the two or more other particles; wherein the secondary charge on the two or more other particles creates an electrostatic repulsive force between said particles; wherein the electrostatic repulsive force is greater than or equal to the balance of forces, such that said particles are ejected from the surface.

In some examples, the average particle size of the plurality of particles is from 1 micrometer (microns, μm) to 140 μm. In some examples, the average particle size is from 1 μm to 60 μm, from 1 μm to 25 μm, or from 10 μm to 25 μm.

In some examples, the electron beam has an energy of from 80 electron volts (eV) to 400 eV. In some examples, the electron beam has an energy of from 80 eV to 300 eV, from 80 eV to 230 eV, or from 120 eV to 230 eV.

In some examples, the electron beam has a current density of from 0.1 microamperes per square centimeter ($\mu A/cm^2$) to 10 $\mu A/cm^2$. In some examples, the electron beam has a current density of from 1.5 $\mu A/cm^2$ to 3 $\mu A/cm^2$.

In some examples, the electron beam is provided by an electron beam source and the electron beam source is separated from the surface of the substrate by a distance of from 1 millimeter to 100 centimeters.

In some examples, the electron beam has an angle of incidence relative to the surface of from 0° to 180°.

In some examples, the first location comprises a plurality of first locations, the electron beam comprises a plurality of electron beams, and each of the plurality of electron beams independently has an angle of incidence relative to the surface of from 0° to 180°.

In some examples, the method further comprises: irradiating a second location of the layer of dust with the electron beam; wherein the layer of dust further comprises a second cavity defined by a second portion of the plurality of particles, said second portion of the plurality of particles comprising 3 or more particles; wherein the second location includes the second cavity, such that the electron beam traverses at least a portion of the second cavity to irradiate a particle within the second portion of the particles, said particle being a second irradiated particle; thereby inducing the second irradiated particle to emit a plurality of secondary electrons; wherein at least a portion of the plurality of secondary electrons traverse at least a portion of the second cavity and impinge two or more of the other particles within the second portion of particles to thereby generate a secondary charge on the two or more other particles within the second portion of particles; wherein the secondary charge on the two or more other particles of the second portion of particles creates an electrostatic repulsive force between said particles; wherein the electrostatic repulsive force is greater than or equal to the balance of forces, such that said particles are ejected from the surface.

In some examples, the substrate is translocated to illuminate the second location.

In some examples, the electron beam is provided by an electron beam source and the electron beam source is translocated to illuminate the second location.

In some examples, the first location and the second location are each independently irradiated for an amount of time of from 1 second to 10 minutes. In some examples, the first location and the second location are each independently irradiated for an amount of time of 1 minute or less.

In some examples, 50% or more, 75% or more, or 90% or more of the dust is ejected from the surface.

In some examples, the substrate comprises a man-made substrate.

In some examples, the substrate comprises a metal, a semiconductor, an insulator, or a combination thereof. In some examples, the substrate comprises an indium tin oxide (ITO) coated substrate, glass, or a combination thereof. In some examples, the substrate comprises at least a portion of a device used for robotic or human extraterrestrial exploration. In some examples, the surface is a surface of a lunar Extravehicular Activity system. In some examples, the substrate comprises thermal blanket, Kapton tape, camera lens, spacesuit, laser retroreflector, radiator, thermal control surface, photovoltaic panel, a mechanical joint, a mechanical seal, or a combination thereof.

In some examples, the method further comprises neutralizing the charge of the surface after ejecting the particles from the surface.

In some examples, the method further comprises pre-cleaning the surface of the substrate prior to irradiating the first location. In some examples, pre-cleaning the surface of the substrate comprises brushing the surface of the substrate. In some examples, prior to pre-cleaning, the surface of the substrate has a preliminary layer of dust is disposed thereon, and wherein the pre-cleaning removes a portion of the preliminary layer of dust to form the layer of dust. In some examples, the preliminary layer of dust includes a second plurality of particles having a second average particle size, the second average particle size being greater than the average particle size, and the pre-cleaning step removes said second plurality of particles; the preliminary layer of dust has a second average thickness, the second average thickness being greater than the average thickness, and the pre-cleaning step reduces the second average thickness to the average thickness; or a combination thereof.

In some examples, the method is performed at a pressure of 760 Torr or less, 25 Torr or less, 5 Torr or less, or 1 milliTorr or less.

In some examples, the method is performed in an extraterrestrial environment.

In some examples, the method is performed on an airless planetary body.

In some examples, the method is performed on the Earth's moon. In some examples, the dust comprises lunar regolith.

Also disclosed herein are devices configured to perform any of the methods disclosed herein. In some examples, the device comprises an electron beam source configured to provide the electron beam. In some examples, the device comprises a plurality of electron beam sources configured to provide a plurality of electron beams, wherein each of the plurality of electron beams plurality of electron beams is configured to independently have an angle of incidence relative to the surface of from 0° to 180°. In some examples, the device further comprises a means for translating the substrate, the electron beam source(s), or a combination thereof. In some examples, the device further comprises a rigid frame configured to support the electron beam source (s). In some examples, the device further comprises a housing configured to house the electron beam source. In some examples, the device is a handheld device.

Additional advantages of the disclosed methods and devices will be set forth in part in the description which follows, and in part will be obvious from the description. The advantages of the disclosed methods and devices will be realized and attained by means of the elements and combinations particularly pointed out in the appended claims. It is to be understood that both the foregoing general description and the following detailed description are exemplary and explanatory only and are not restrictive of the disclosed methods and devices, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description serve to explain the principles of the disclosure.

DETAILED DESCRIPTION

Figure 1:
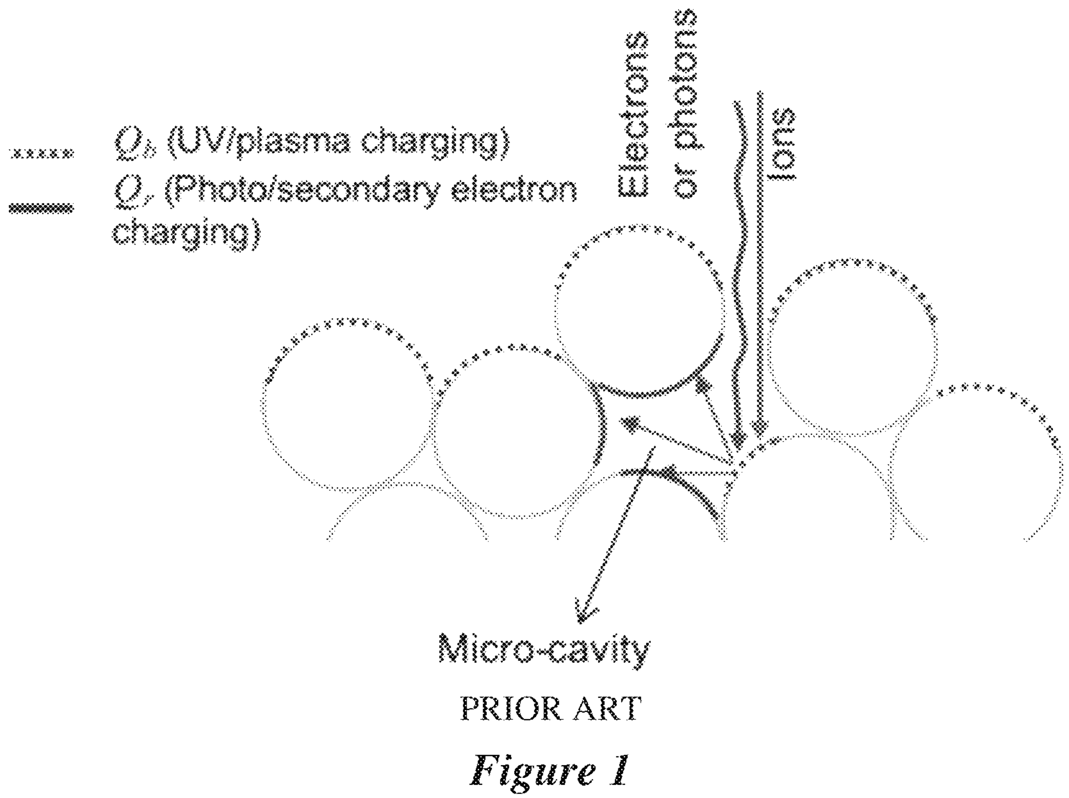
PRIOR ART Figure 1
FIG. 1. Patched charge model for a dusty surface (X Wang et al. Geophys. Res. Lett. 43 (2016) 6103-6110). Inside a microcavity between dust particles, the surface patch exposed to electron beam or UV (dotted lines) emits secondary electrons or photoelectrons, which then deposit on the indicated surface patches of the surrounding particles.

The methods and devices described herein may be understood more readily by reference to the following detailed description of specific aspects of the disclosed subject matter and the Examples included therein.

Before the present methods and devices are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification, the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values can be expressed herein as an "average" value. "Average" generally refers to the statistical mean value.

By "substantially" is meant within 5%, e.g., within 4%, 3%, 2%, or 1%.

"Exemplary" means "an example of" and is not intended to convey an indication of a preferred or ideal embodiment. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Disclosed herein are methods and devices for cleaning a surface of a substrate having a layer of dust disposed thereon by ejecting at least a portion of the dust from the surface.

For example, disclosed herein are methods of cleaning a surface of a substrate having a layer of dust disposed thereon, the methods comprising irradiating a first location of the layer of dust with an electron beam. As used herein, "a first location" and "the first location" are meant to include any number of locations in any arrangement on the surface of the substrate. Thus, for example "a first location" includes one or more first locations. In some embodiments, the first location can comprise a plurality of locations.

The layer of dust comprises a plurality of particles having an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. Mean particle size can be measured using methods known in the art, such as evaluation by microscopy (e.g. electron microscopy) and/or dynamic light scattering.

In some examples, the average particle size of the plurality of particles is 1 micrometer (microns, μm) or more (e.g., 2 μm or more, 3 μm or more, 4 μm or more, 5 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, 90 μm or more, 100 μm or more, 110 μm or more, 120 μm or more, or 130 μm or more). In some examples, the average particle size of the plurality of particles is 140 μm or less (e.g., 130 μm or less, 120 μm or less, 110 μm or less, 100 μm or less, 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, or 5 μm or less). The average particle size of the plurality of particles can range from any of the minimum values described above to any of the maximum values described above. For example, the average particle size of the plurality of particles can be from 1 micrometer (microns, μm) to 140 μm (e.g., from 1 μm to 70 μm, from 70 μm to 140 μm, from 1 μm to 35 μm, from 35 μm to 70 μm, from 70 μm to 105 μm, from 105 μm to 140 μm, from 5 μm to 140 μm, from 1 μm to 140 μm, from 5 μm to 130 μm, from 1 μm to 60 μm, from 1 μm to 25 μm, or from 10 μm to 25 μm).

The layer of dust can be substantially continuous or discontinuous (e.g., a sparse layer). In some examples, the layer of dust can be substantially continuous comprising a monolayer of particles or more (e.g., multiple layers). In some examples, the layer of dust can be a sparse layer comprising one or more islands of dust, each island comprising one or more particles.

The layer of dust can, for example, have an average thickness that is 1 or more times the average particle size (e.g., 2 or more, 3 or more, 4 or more, 5 or more, 6 or more, 7 or more, 8 or more, 9 or more, 10 or more, 15 or more, 20 or more, 25 or more, 30 or more, or 35 or more). In some examples, the layer of dust can have an average thickness that is 40 or less times the average particle size (e.g., 35 or less, 30 or less, 25 or less, 20 or less, 15 or less, 10 or less, 9 or less, 8 or less, 7 or less, 6 or less, 5 or less, 4 or less, 3 or less, or 2 or less). The average thickness of the layer of dust can range from any of the minimum values described above to any of the maximum values described above. For example, the layer of dust can have an average thickness that is from 1 to 40 times the average particle size (e.g., from 1 to 20, from 20 to 40, from 1 to 10, from 10 to 20, from 20 to 30, from 30 to 40, from 2 to 40, from 1 to 35, or from 2 to 35). When referring to a sparse layer, the average thickness refers to the average thickness of the one or more islands.

Prior to irradiation, the layer of dust is stuck to the surface. Each of the plurality of particles has a balance of forces, the balance of forces comprising a cohesive force between neighboring particles (e.g., a particle-particle cohesive force), an adhesive force between each particle and the surface (e.g., a particle-surface adhesive force), a gravitational force, or a combination thereof.

The layer of dust further comprises a first cavity defined by a first portion of the plurality of particles, said first portion of the plurality of particles comprising 3 or more particles. The methods comprise irradiating the first location of the layer of dust with an electron beam, wherein the first location includes the first cavity, such that the electron beam traverses at least a portion of the first cavity to irradiate a particle within the first portion of the particles, said particle being an irradiated particle; thereby inducing the irradiated particle to emit a plurality of secondary electrons; wherein at least a portion of the plurality of secondary electrons traverse at least a portion of the first cavity and impinge two or more of the other particles within the first portion of particles to thereby generate a secondary charge on the two or more other particles; wherein the secondary charge on the two or more other particles creates an electrostatic repulsive force between said particles; wherein the electrostatic repulsive force is greater than or equal to the balance of forces, such that said particles are ejected from the surface.

The electron beam can, for example, have an energy of 80 electron volts (eV) or more (e.g., 85 eV or more, 90 eV or more, 95 eV or more, 100 eV or more, 110 eV or more, 120 eV or more, 130 eV or more, 140 eV or more, 150 eV or more, 160 eV or more, 170 eV or more, 180 eV or more, 190 eV or more, 200 eV or more, 210 eV or more, 220 eV or more, 230 eV or more, 240 eV or more, 250 eV or more, 275 eV or more, 300 eV or more, 325 eV or more, 350 eV or more, or 375 eV or more). In some examples, the electron beam can have an energy of 400 eV or less (e.g., 375 eV or less, 350 eV or less, 325 eV or less, 300 eV or less, 275 eV or less, 250 eV or less, 240 eV or less, 230 eV or less, 220 eV or less, 210 eV or less, 200 eV or less, 190 eV or less, 180 eV or less, 170 eV or less, 160 eV or less, 150 eV or less, 140 eV or less, 130 eV or less, 120 eV or less, 110 eV or less, 100 eV or less, 95 eV or less, or 90 eV or less). The energy of the electron beam can range from any of the minimum values described above to any of the maximum values described above. For example, the electron beam can have an energy of from 80 electron volts (eV) to 400 eV (e.g., from 80 eV to 240 eV, from 240 eV to 400 eV, from 80 eV to 120 eV, from 120 eV to 160 eV, from 160 eV to 200 eV, from 200 eV to 240 eV, from 240 eV to 280 eV, from 280 eV to 320 eV, from 320 eV to 360 eV, from 360 eV to 400 eV, from 90 eV to 400 eV, from 80 eV to 375 eV, from 90 eV to 375 eV, from 80 eV to 300 eV, from 80 eV to 300 eV, from 80 eV to 230 eV, or from 120 eV to 230 eV).

The electron beam can, for example, have a current density of 0.1 or more microamperes per square centimeter (μA/cm$^2$) (e.g., 0.2 μA/cm$^2$ or more, 0.3 μA/cm$^2$ or more, 0.4 μA/cm$^2$ or more, 0.5 μA/cm$^2$ or more, 0.6 μA/cm$^2$ or more, 0.7 μA/cm$^2$ or more, 0.8 μA/cm$^2$ or more, 0.9 μA/cm$^2$ or more, 1 μA/cm$^2$ or more, 1.25 μA/cm$^2$ or more, 1.5 μA/cm$^2$ or more, 1.75 μA/cm$^2$ or more, 2 μA/cm$^2$ or more, 2.5 μA/cm$^2$ or more, 3 μA/cm$^2$ or more, 3.5 μA/cm$^2$ or more, 4 μA/cm$^2$ or more, 4.5 μA/cm$^2$ or more, 5 μA/cm$^2$ or more, 5.5 μA/cm$^2$ or more, 6 μA/cm$^2$ or more, 6.5 μA/cm$^2$ or more, 7 μA/cm$^2$ or more, 7.5 μA/cm$^2$ or more, 8 μA/cm$^2$ or more, 8.5 μA/cm$^2$ or more, 9 μA/cm$^2$ or more, or 9.5 μA/cm$^2$ or more). In some examples, the electron beam can have a current density of 10 μA/cm$^2$ or less (e.g., 9.5 μA/cm$^2$ or less, 9 μA/cm$^2$ or less, 8.5 μA/cm$^2$ or less, 8 μA/cm$^2$ or less, 7.5 μA/cm$^2$ or less, 7 μA/cm$^2$ or less, 6.5 μA/cm$^2$ or less, 6 μA/cm$^2$ or less, 5.5 μA/cm$^2$ or less, 5 μA/cm$^2$ or less, 4.5 μA/cm$^2$ or less, 4 μA/cm$^2$ or less, 3.5 μA/cm$^2$ or less, 3 μA/cm$^2$ or less, 2.5 μA/cm$^2$ or less, 2 μA/cm$^2$ or less, 1.75 μA/cm$^2$ or less, 1.5 μA/cm$^2$ or less, 1.25 μA/cm$^2$ or less, 1 μA/cm$^2$ or less, 0.9 μA/cm$^2$ or less, 0.8 μA/cm$^2$ or less, 0.7 μA/cm$^2$ or less, 0.6 μA/cm$^2$ or less, 0.5 μA/cm$^2$ or less, 0.4 μA/cm$^2$ or less, 0.3 μA/cm$^2$ or less, or 0.2 μA/cm$^2$ or less). The current density of the electron beam can range from any of the minimum values described above to any of the maximum values described above. For example, the electron beam can have a current density of from 0.1 microamperes per square centimeter (μA/cm$^2$) to 10 μA/cm$^2$ (e.g., from 0.1 μA/cm$^2$ to 5 μA/cm$^2$, from 5 μA/cm$^2$ to 10 μA/cm$^2$, from 0.1 μA/cm$^2$ to 2 μA/cm$^2$, from 2 μA/cm$^2$ to 4 μA/cm$^2$, from 4 μA/cm$^2$ to 6 μA/cm$^2$, from 6 μA/cm$^2$ to 8 μA/cm$^2$, from 8 μA/cm$^2$ to 10 μA/cm$^2$, from 0.5 μA/cm$^2$ to 10 μA/cm$^2$, from 0.1 μA/cm$^2$ to 9.5 μA/cm$^2$, from 0.5 μA/cm$^2$ to 9.5 μA/cm$^2$, from 0.5 μA/cm$^2$ to 6 μA/cm$^2$, or from 1.5 μA/cm$^2$ to 3 μA/cm$^2$).

The electron beam can, for example, be provided by an electron beam source. In some examples, the electron beam source is separated from the surface of the substrate by a distance of 1 millimeter (mm) or more (e.g., 2 mm or more, 3 mm or more, 4 mm or more, 5 mm or more, 6 mm or more, 7 mm or more, 8 mm or more, 9 mm or more, 1 centimeter (cm) or more, 1.5 cm or more, 2 cm or more, 2.5 cm or more, 3 cm or more, 4 cm or more, 5 cm or more, 10 cm or more, 15 cm or more, 20 cm or more, 25 cm or more, 30 cm or more, 35 cm or more, 40 cm or more, 45 cm or more, 50 cm or more, 60 cm or more, 70 cm or more, 80 cm or more, or 90 cm or more). In some examples, the electron beam source is separated from the surface of the substrate by a distance of 100 centimeters (cm) or less (e.g., 90 cm or less, 80 cm or less, 70 cm or less, 60 cm or less, 50 cm or less, 45 cm or less, 40 cm or less, 35 cm or less, 30 cm or less, 25 cm or less, 20 cm or less, 15 cm or less, 10 cm or less, 5 cm or less, 4.5 cm or less, 4 cm or less, 3.5 cm or less, 3 cm or less, 2.5 cm or less, 2 cm or less, 1.5 cm or less, 1 cm or less, 9 mm or less, 8 mm or less, 7 mm or less, 6 mm or less, 5 mm or less, 4 mm or less, 3 mm or less, or 2 mm or less). The distance between the electron beam source and the surface of the substrate can range from any of the minimum values described above to any of the maximum values described above. For example, the electron beam source is separated from the surface of the substrate by a distance of from 1 millimeter to 100 centimeters (e.g., from 1 mm to 50 cm, from 50 cm to 100 cm, from 1 mm to 1 cm, from 1 cm to 10 cm, from 10 cm to 100 cm, from 5 mm to 100 cm, from 1 mm to 90 cm, or from 5 mm to 90 cm).

The electron beam can, for example, have an angle of incidence relative to the surface of the substrate of 0° or more (e.g., 1° or more, 2° or more, 3° or more, 4° or more, 5° or more, 10° or more, 15° or more, 20° or more, 25° or more, 30° or more, 35° or more, 40° or more, 45° or more, 50° or more, 55° or more, 60° or more, 65° or more, 70° or more, 75° or more, 80° or more, 85° or more, 90° or more, 95° or more, 100° or more, 105° or more, 110° or more, 115° or more, 120° or more, 125° or more, 130° or more, 135° or more, 140° or more, 145° or more, 150° or more, 155° or more, 160° or more, 165° or more, 170° or more, or 175° or more). In some examples, the electron beam can have an angle of incidence relative to the surface of the substrate of 180° or less (e.g., 175° or less, 170° or less, 165° or less, 160° or less, 155° or less, 150° or less, 145° or less, 140° or less, 135° or less, 130° or less, 125° or less, 120° or less, 115° or less, 110° or less, 105° or less, 100° or less, 95° or less, 90° or less, 85° or less, 80° or less, 75° or less, 70° or less, 65° or less, 60° or less, 55° or less, 50° or less, 45° or less, 40° or less, 35° or less, 30° or less, 25° or less, 20° or less, 15° or less, 10° or less, or 5° or less). The angle of incidence of the electron beam relative to the surface of the substrate can range from any of the minimum values described above to any of the maximum values described above. For example, the electron beam can have an angle of incidence relative to the surface of the substrate of from 0° to 180° (e.g., from 0° to 90°, from 90° to 180°, from 0° to 30°, from 30° to 60°, from 60° to 90°, from 90° to 120°, from 120° to 150°, from 150° to 180°, from 5° to 180°, from 1° to 175°, or from 5° to 175°).

In some examples, the first location comprises a plurality of first locations, the electron beam comprises a plurality of electron beams, and each of the plurality of electron beams independently has an angle of incidence relative to the surface of 0° or more (e.g., 1° or more, 2° or more, 3° or more, 4° or more, 5° or more, 10° or more, 15° or more, 20° or more, 25° or more, 30° or more, 35° or more, 40° or more, 45° or more, 50° or more, 55° or more, 60° or more, 65° or more, 70° or more, 75° or more, 80° or more, 85° or more, 90° or more, 95° or more, 100° or more, 105° or more, 110° or more, 115° or more, 120° or more, 125° or more, 130° or more, 135° or more, 140° or more, 145° or more, 150° or more, 155° or more, 160° or more, 165° or more, 170° or more, or 175° or more). In some examples, the first location comprises a plurality of first locations, the electron beam comprises a plurality of electron beams, and each of the plurality of electron beams independently has an angle of incidence relative to the surface of 180° or less (e.g., 175° or less, 170° or less, 165° or less, 160° or less, 155° or less, 150° or less, 145° or less, 140° or less, 135° or less, 130° or less, 125° or less, 120° or less, 115° or less, 110° or less, 105° or less, 100° or less, 95° or less, 90° or less, 85° or less, 80° or less, 75° or less, 70° or less, 65° or less, 60° or less, 55° or less, 50° or less, 45° or less, 40° or less, 35° or less, 30° or less, 25° or less, 20° or less, 15° or less, 10° or less, or 5° or less). The angle of incidence of each of the plurality of electron beams can independently range from any of the minimum values described above o any of the maximum values described above. For example, the first location comprises a plurality of first locations, the electron beam comprises a plurality of electron beams, and each of the plurality of electron beams independently has an angle of incidence relative to the surface of from 0° to 180° (e.g., from 0° to 90°, from 90° to 180°, from 0° to 30°, from 30° to 60°, from 60° to 90°, from 90° to 120°, from 120° to 150°, from 150° to 180°, from 5° to 180°, from 1° to 175°, or from 5° to 175°).

In some examples, the method further comprises: irradiating a second location of the layer of dust with the electron beam; wherein the layer of dust further comprises a second cavity defined by a second portion of the plurality of particles, said second portion of the plurality of particles comprising 3 or more particles; wherein the second location includes the second cavity, such that the electron beam traverses at least a portion of the second cavity to irradiate a particle within the second portion of the particles, said particle being a second irradiated particle; thereby inducing the second irradiated particle to emit a plurality of secondary electrons; wherein at least a portion of the plurality of secondary electrons traverse at least a portion of the second cavity and impinge two or more of the other particles within the second portion of particles to thereby generate a secondary charge on the two or more other particles within the second portion of particles; wherein the secondary charge on the two or more other particles of the second portion of particles creates an electrostatic repulsive force between said particles; wherein the electrostatic repulsive force is greater than or equal to the balance of forces, such that said particles are ejected from the surface.

In some examples, the substrate is translocated to illuminate the second location. As used herein translocating refers to any type of movement about any axis (e.g., rotation, translation, etc.) In other words, as used herein, translocation refers to a change in position and/or orientation.

In some examples, the electron beam is provided by an electron beam source and the electron beam source is translocated to illuminate the second location.

The first location and the second location can, for example, each independently be irradiated for an amount of time of 1 second or more (e.g., 2 seconds or more, 3 seconds or more, 4 seconds or more, 5 seconds or more, 10 seconds or more, 15 seconds or more, 20 seconds or more, 25 seconds or more, 30 seconds or more, 35 seconds or more, 40 seconds or more, 45 seconds or more, 50 seconds or more, 55 seconds or more, 1 minute or more, 1.25 minutes or more, 1.5 minutes or more, 1.75 minutes or more, 2 minutes or more, 2.25 minutes or more, 2.5 minutes or more, 3 minutes or more, 3.5 minutes or more, 4 minutes or more, 4.5 minutes or more, 5 minutes or more, 5.5 minutes or more, 6 minutes or more, 6.5 minutes or more, 7 minutes or more, 7.5 minutes or more, 8 minutes or more, 8.5 minutes or more, 9 minutes or more, or 9.5 minutes or more). In some examples, the first location and the second location can each independently be irradiated for an amount of time of 10 minutes or less (e.g., 9.5 minutes or less, 9 minutes or less, 8.5 minutes or less, 8 minutes or less, 7.5 minutes or less, 7 minutes or less, 6.5 minutes or less, 6 minutes or less, 5.5 minutes or less, 5 minutes or less, 4.5 minutes or less, 4 minutes or less, 3.5 minutes or less, 3 minutes or less, 2.5 minutes or less, 2.25 minutes or less, 2 minutes or less, 1.75 minutes or less, 1.5 minutes or less, 1.25 minutes or less, 1 minute or less, 55 seconds or less, 50 seconds or less, 45 seconds or less, 40 seconds or less, 35 seconds or less, 30 seconds or less, 25 seconds or less, 20 seconds or less, 15 seconds or less, 10 seconds or less, or 5 seconds or less). The amount of time that the first location and the second location are irradiated can independently range from any of the minimum values described above to any of the maximum values described above. For example, the first location and the second location can each independently be irradiated for an amount of time of from 1 second to 10 minutes (e.g., from 1 second to 1 minute, from 1 minute to 10 minutes, from 1 second to 30 seconds, from 30 seconds to 1 minute, from 1 minute to 5 minutes, from 5 minutes to 10 minutes, from 1 second to 2 minutes, from 2 minutes to 4 minutes, from 4 minutes to 6 minutes, from 6 minutes to 8 minutes, from 8 minutes to 10 minutes, from 5 seconds to 10 minutes, from 1 second to 9 minutes, from 5 seconds to 9 minutes, from 1 second to 8 minutes, from 1 second to 6 minutes, from 1 second to 5 minutes, from 1 second to 4 minutes, from 1 second to 3 minutes, from 1 second to 2 minutes, or from 1 second to 55 seconds). In some examples, the first location and the second location are each independently irradiated for an amount of time of 1 minute or less.

In some examples, 50% or more of the dust is ejected from the surface (e.g., 55% or more, 60% or more, 65% or more, 70% or more, 75% or more, 80% or more, 85% or more, 90% or more, 95% or more, or 99% or more).

In some examples, the substrate comprises a man-made substrate. The substrate can, for example, comprise a metal, a semiconductor, an insulator, or a combination thereof. In some examples, the substrate comprises an indium tin oxide (ITO) coated substrate, glass, or a combination thereof. In some examples, the substrate comprises a metal, such as aluminum, anodized aluminum, etc. In some examples, the substrate comprises at least a portion of a device used for extraterrestrial exploration (e.g., robotic or human extraterrestrial exploration). The surface can, for example, be a surface of a lunar Extravehicular Activity system. In some examples, the substrate comprises thermal blanket, Kapton tape, camera lens, spacesuit, laser retroreflector, radiator, thermal control surface, photovoltaic panel, a mechanical joint, a mechanical seal, or a combination thereof.

In some examples, the substrate can comprise a component used in semiconductor manufacturing, such as, for example, a wafer, a mask (e.g., a lithographic mask), etc. In some examples, the method can be performed as part of a semiconductor manufacturing process.

In some examples, the method further comprises neutralizing the charge of the surface after ejecting the particles from the surface.

In some examples, the method further comprises pre-cleaning the surface of the substrate prior to irradiating the first location. Pre-cleaning the surface of the substrate can, for example, comprise brushing the surface of the substrate. Prior to pre-cleaning, the surface of the substrate can have a preliminary layer of dust is disposed thereon, and the pre-cleaning can remove a portion of the preliminary layer of dust to form the layer of dust. For example, the preliminary layer of dust can include a second plurality of particles having a second average particle size, the second average particle size being greater than the average particle size, and the pre-cleaning step can remove said second plurality of particles; the preliminary layer of dust can have a second average thickness, the second average thickness being greater than the average thickness, and the pre-cleaning step can reduce the second average thickness to the average thickness; or a combination thereof.

The method can, for example, be performed at a pressure of 760 Torr or less (e.g., 700 Torr or less, 600 Torr or less, 500 Torr or less, 400 Torr or less, 300 Torr or less, 250 Torr or less, 200 Torr or less, 150 Torr or less, 100 Torr or less, 75 Torr or less, 50 Torr or less, 25 Torr or less, 20 Torr or less, 15 Torr or less, 10 Torr or less, 5 Torr or less, 4 Torr or less, 3 Torr or less, 2 Torr or less, 1 Torr or less, $5\times10^{-1}$ Torr or less, $1\times10^{-1}$ Torr or less, $5\times10^{-2}$ Torr or less, $1\times10^{-2}$ Torr or less, $5\times10^{-3}$ Torr or less, $1\times10^{-3}$ Torr or less, $5\times10^{-4}$ Torr or less, $1\times10^{-4}$ Torr or less, $5\times10^{-5}$ Torr or less, $1\times10^{-5}$ Torr or less, $5\times10^{-6}$ Torr or less, $1\times10^{-6}$ Torr or less, $5\times10^{-7}$ Torr or less, $1\times10^{-7}$ Torr or less, $5\times10^{-8}$ Torr or less, $1\times10^{-8}$ Torr or less, $5\times10^{-9}$ Torr or less, $1\times10^{-9}$ Torr or less, $5\times10^{-10}$ Torr or less, $1\times10^{-10}$ Torr or less, $5\times10^{-11}$ Torr or less, $1\times10^{-11}$ Torr or less, $5\times10^{-12}$ Torr or less, $1\times10^{-12}$ Torr or less, $1\times10^{-13}$ Torr or less, $1\times10^{-14}$ Torr or less, $1\times10^{-15}$ Torr or less, $1\times10^{-16}$ Torr or less, or $1\times10^{-17+}$ Torr or less).

In some examples, the method can be performed at a pressure of $1\times10^{-18}$ Torr or more (e.g., $1\times10^{-17}$ Torr or more, $1\times10^{-16}$ Torr or more, $1\times10^{-15}$ Torr or more, $1\times10^{-14}$ Torr or more, $1\times10^{-13}$ Torr or more, $1\times10^{-12}$ Torr or more, $5\times10^{-12}$ Torr or more, $1\times10^{-11}$ Torr or more, $5\times10^{-11}$ Torr or more, $1\times10^{-10}$ Torr or more, $5\times10^{-10}$ Torr or more, $1\times10^{-9}$ Torr or more, $5\times10^{-9}$ Torr or more, $1\times10^{-8}$ Torr or more, $5\times10^{-8}$ Torr or more, $1\times10^{-7}$ Torr or more, $5\times10^{-7}$ Torr or more, $1\times10^{-6}$ Torr or more, $5\times10^{-6}$ Torr or more, $1\times10^{-5}$ Torr or more, $5\times10^{-5}$ Torr or more, $1\times10^{-4}$ Torr or more, $5\times10^{-4}$ Torr or more, $1\times10^{-3}$ Torr or more, $5\times10^{-3}$ Torr or more, $1\times10^{-2}$ Torr or more, $5\times10^{-2}$ Torr or more, $1\times10^{-1}$ Torr or more, $5\times10^{-1}$ Torr or more, 1 Torr or more, 2 Torr or more, 3 Torr or more, 4 Torr or more, 5 Torr or more, 10 Torr or more, 15 Torr or more, 20 Torr or more, 25 Torr or more, 50 Torr or more, 75 Torr or more, 100 Torr or more, 150 Torr or more, 200 Torr or more, 250 Torr or more, 300 Torr or more, 400 Torr or more, 500 Torr or more, 600 Torr or more, or 700 Torr or more).

The pressure at which the method is performed can range from any of the minimum values described above to any of the maximum values described above. For example, the method can be performed at a pressure of from $1\times10^{-18}$ Torr to 760 Torr (e.g., $1\times10^{-18}$ Torr to $1\times10^{-3}$ Torr, from $1\times10^{-3}$ Torr to 760 Torr, from $1\times10^{-18}$ Torr to $1\times10^{-12}$ Torr, from $1\times10^{-12}$ Torr to $1\times10^{-6}$ Torr, from $1\times10^{-6}$ Torr to 1 Torr, from 1 Torr to 25 Torr, from 25 Torr to 760 Torr, from $5\times10^{-18}$ Torr to 760 Torr, from $1\times10^{-18}$ Torr to 700 Torr, from $5\times10^{-18}$ Torr to 700 Torr, from $1\times10^{-18}$ Torr to 500 Torr, from $1\times10^{-18}$ Torr to 250 Torr, from $1\times10^{-18}$ Torr to 100 Torr, from $1\times10^{-18}$ Torr to 25 Torr, from $1\times10^{-18}$ Torr to 1 Torr, from $1\times10^{-18}$ Torr to $1\times10^{-3}$ Torr, from $1\times10^{-18}$ Torr to $1\times10^{-6}$ Torr, from $1\times10^{-18}$ Torr to $1\times10^{-9}$ Torr, from $1\times10^{-18}$ Torr to $1\times10^{-12}$ Torr, or from $1\times10^{-18}$ Torr to $\times10^{-15}$ Torr). In some examples, the method can be performed at a pressure of 4 Torr or less. In some examples, the method can be performed at a pressure of 1 milliTorr or less. In some examples, the method can be performed at a pressure of from 0.1 to 1 milliTorr.

In some examples, the method can be performed under vacuum. For example, the method can be performed under low vacuum (e.g., 25-760 Torr), medium vacuum (e.g., 25 to $1\times10^{-3}$ Torr), high vacuum (e.g., $1\times10^{-3}$ to $1\times10^{-9}$ Torr), ultrahigh vacuum (e.g., $1\times10^{-9}$ to $1\times10^{-12}$ Torr), or extremely high vacuum (e.g., $<1\times10^{-12}$ Torr). In some examples, the method can be performed in outer space (e.g., at a pressure of from $1\times10^{-6}$ to less than $1\times10^{-17}$ Torr).

In some examples, the method is performed in an extraterrestrial environment. For example, the method can be performed on an airless planetary body (e.g., moon, asteroid, etc.). In some examples, the method is performed on the Earth's moon. In some examples, the dust comprises lunar regolith.

Also disclosed herein are devices configured to perform any of the methods described herein. For example, the device can comprise an electron beam source configured to provide the electron beam. In some examples, the device comprises a plurality of electron beam sources configured to provide a plurality of electron beams. In some examples, each of the plurality of electron beams plurality of electron beams is configured to independently have an angle of incidence relative to the surface of from 0° to 180°.

In some examples, the device further comprises a means for translating the substrate, the electron beam source(s), or a combination thereof.

In some examples, the device further comprises a rigid frame configured to support the electron beam source(s).

In some examples, the device further comprises a housing configured to house the electron beam source.

In some examples, the device is a handheld device.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

The lunar surface is covered by a layer of dust particles called regolith. These dust particles can be stirred up during robotic and human exploration activities or released by natural processes such as meteorite impacts. Dust mobilized on the lunar surface due to natural processes and/or human activities can readily stick to all surfaces, such as spacesuits, optical devices, thermal blankets, and mechanical components, causing numerous problems. Apollo mission spacesuits were damaged by abrasive lunar dust and several astronauts noted that moon dust was resistant to cleaning efforts; even vigorous brushing could not remove it. Lunar dust exhibits several characteristics that make it difficult to remove. For example, unlike Earth, the Moon does not have an atmosphere and global magnetic field to protect its surface from solar radiation. The solar wind can electrically charge dust particles on the Moon, causing the charged particles to stick to each other and to other surfaces. In addition, lunar dust particles are very jagged and rough, which also increases their "sticking power." Dust mitigation is required in order to ensure success of future human and robotic exploration, especially long-term presence, on the lunar surface. Several dust mitigation technologies have been investigated over the past years, but they all have advantages and disadvantages.

Disclosed herein are methods and devices utilizing an electron beam to charge and remove dust off various surfaces. When the electron beam is applied to a micro-cavity formed in a pile of dust, the induced secondary electrons are collected by the surrounding dust particles, resulting in a substantial negative charge buildup on the dust particles' surfaces. The repulsive force between these negatively charged dust particles ejects them off the surface.

These methods and devices can be used for dust mitigation, such as for lunar exploration. The devices and methods disclosed herein are relatively easy-to-use and work for most of surfaces.

Unlike other technologies that require incorporating a complex design of active embedded layers on the surface to be cleaned, the electron beam technology is a non-contact, standalone, portable device that can be potentially used on any dust-covered space hardware surfaces on the Moon.

The electrostatic cleaning technology can clean the finest lunar dust. In comparison to the current technologies, the electron beam dust mitigation technology is efficient at cleaning the finest lunar dust, which creates most trouble and is most difficult to be cleaned.

NASA has recently laid out the architecture of an ambitious long-term Artemis program that will send Americans back to the Moon and stay. More importantly, lunar surface exploration is changing from the course of how it was implemented in the past to a new model, which is commercialization with a creation of the Commercial Lunar Payload Services (CLPS). CLPS consists of a number of private companies that will compete to provide various services to send equipment and humans to the surface of the Moon to perform various scientific and exploration activities on the lunar surface for long-term. In addition, the Moon will be a pitstop for going to Mars and beyond to deeper space. It can be envisioned that the Moon will be a hot spot with many future activities. Lunar dust is one of the technical challenges as recognized by the Lunar Surface Innovation Consortium (LSIC), which has an urgent need to be mitigated in order to ensure success of future large-scale robotic and human activities on the lunar surface. There is large need for dust mitigation technologies, including the electron beam dust mitigation technology disclosed herein.

Example 2—Dust Mitigation Technology for Lunar Exploration Utilizing an Electron Beam Abstract. Dust mobilized on the lunar surface due to natural processes and/or human activities can readily stick to spacesuits, optical devices, and mechanical components, for example. This may lead to dust hazards that have been considered as one of the technical challenges for future lunar exploration. Several dust mitigation technologies have been investigated over the past years. Herein, a method utilizing an electron beam to shed dust off of surfaces is presented. Recent studies on electrostatic dust lofting have shown that the emission and absorption of secondary electrons or photoelectrons inside microcavities forming between dust particles can cause the buildup of substantial negative charges on the surrounding particles. The subsequent repulsive forces between these particles can cause their release from the surface. Fine-sized lunar simulant particles (JSC-1A, <25 μm in diameter) were used in these experiments. The cleaning performance was tested against the electron beam energy and current density, the surface material, as well as thickness of the initial dust layer. It is shown that the overall cleanliness can reach 75-85% on the timescale of ~100 s with the optimized electron beam parameters (~230 eV and minimum current density between 1.5 and 3 μA/cm$^2$), depending on the thickness of the initial dust layer. The maximum cleanliness is found to be similar between a spacesuit sample and a glass surface.

Introduction. The lunar surface is covered by a layer of dust particles, called regolith. These dust particles can be stirred up due to robotic and/or human exploration activities, or can be released by natural processes such as meteoroid impacts and electrostatic lofting. As reported from the Apollo missions, these dust particles can readily stick to surfaces, such as spacesuits, optical lenses and thermal blankets, causing a series of problems. Spacesuits were found damaged by abrasive lunar dust (R. Goodwin. Apollo 17: the NASA Mission Reports, vol. 1, Apogee Books, ON, Canada, 2002, 2002). Laser retroflectors on the lunar surface have been reported to show reduced light reflectance over time, likely due to dust accumulation on their surfaces (TW Murphy et al. Icarus 208 (2010) 31-35; TW Murphy et al. Icarus 231 (2014) 183-192). Radiators and thermal control surfaces (TCSs) covered by dust showed degradation in their performance (JR Gaier et al. NASA/TM-2011-217231/AIAA-2011-5182 (2011) 2011; JR Gaier et al. NASA/TM-2011-217230/AIAA-2011-5183 (2011) 2011). Dust interfered with the lunar Extravehicular Activity (EVA) systems (JR Gaier. NASA/TM-2005-213610 (2005) 2005). Solar panels covered by dust yield a lower power output (CM Katzan et al. Space Photovoltaic Research and Technology Conference, NASA Lewis Research Center, Cleveland, Ohio, 1991, 1991). Dust can clog mechanical joints and seals, causing failures of these parts. In addition to mechanical concerns, dust brought back to living quarters could lead to serious health risks when inhaled by astronauts (DG Schrunk et al. The Moon: Resources, Future Development and Colonization, Praxis Publishing Ltd., Chichester, 1999, p. 1999; JT James et al. NASA-SP-2009-3045 (2009) 2009). As said above, lunar dust hazards can be problematic and have been recognized as one of the major technical challenges for future human and robotic exploration on the lunar surface.

Over the past decades, several dust mitigation technologies have been studied and developed (N Afshar-Mohajer et al. Adv. Space Res. 56 (2015) 1222-1241). These technologies can be divided into four categories: fluidal methods, mechanical methods, electrodynamic methods, and passive methods. Fluidal methods include using liquid jets, foams, and compressed gases to remove dust from the surfaces (F Tatom et al. NASA Technical Report No. TR-792-7-207A 3-1 (1967) 1967; RV Peterson et al. Proc. Optical System Contamination: Effects, Measurement, Control II, International Society for Optics and Photonics, 1990, pp. 72-85; K Wood. NASA-CR-190014 (1991) 1991). Mechanical methods apply brushes (e.g., nylon bristles) or vibrating mechanisms to clean dust. The brushing technique has been used in the Apollo missions. Gaier et al. performed a series of experiments on the effectiveness of various brushes for TCSs (JR Gaier et al. NASA/TM-2011-217231/AIAA-2011-5182 (2011) 2011; JR Gaier et al. NASA/TM-2011-217230/AIAA-2011-5183 (2011) 2011). Electrodynamics Dust Shield (EDS) has been extensively studied (R Sims et al. Proc. ESA—IEEE Joint Meet, Electrostat (2003) 814-821; C Calle et al. IAC-06-A5.2.07 (2006) 2006; C Calle et al. J. Electrost. 67 (2009) 89-92; C Calle et al. Acta Astronaut. 69 (2011) 1082-1088; KK Manyapu et al. Acta Astronaut. 137 (2017) 472-481; H Kawamoto et al. J. Electrost. 94 (2018) 38-43). The basic idea is to apply oscillating high-voltages on electrodes embedded beneath the surface of an equipment to shed dust. This technique is expected to be more efficient in the lunar environment because lunar dust is charged by solar wind plasma, solar radiation and/or tribo-electric effects. In passive methods, surfaces are modified (e.g., through ion implantation) to reduce the dust-surface adhesive force (JR Gaier et al. NASA/TM-2011-217230/AIAA-2011-5183 (2011) 2011; A Dove et al. Planet. Space Sci. 59 (2011) 1784-1790; JR Gaier. Icarus 221 (2012) 167-173; JR Gaier et al. AIAA Aerospace Sciences Meeting, AIAA-2012-0875 (2012) 2012). Recently, dust shedding with plasma discharging was studied. It was demonstrated that dust was removed from a glass sphere exposed to a plasma with an electron beam (TE Sheridan et al. J. Geophys. Res. 97 (1992) 2935; TM Flanagan et al. Phys. Plasmas 13 (2006) 123504). Shooting a plasma jet (1-2 kV) to dust-covered surfaces can effectively remove the dust (CM Tico et al. Rev. Sci. Instrum. 86 (2015) 33509). This plasma jet technique was originally developed for dust mitigation for exploration on the Martian surface which has a 4 Torr atmosphere that can be discharged to create a high-density plasma.

Each of the aforementioned technologies has its advantages and disadvantages, which have been well summarized by Afshar-Mohajer et al. (N Afshar-Mohajer et al. Adv. Space Res. 56 (2015) 1222-1241). Selection of the most appropriate methods depends on the characteristics of the dust, surface properties, and application scenarios. Hybrid use of these technologies is highly recommended to achieve the best cleaning results. Herein, a method utilizing an electron beam to charge dust particles to cause them to jump off of surfaces as a result of electrostatic forces is presented. This method aims to clean fine-sized dust particles (<25 μm in diameter) that have been recognized as a challenge in dust mitigation technology development for several applications.

Dust shedding mechanism utilizing an electron beam. Dust charging and lofting on surfaces in various plasma environments has attracted much attention over the past years. Its studies have broad applications to semiconductor manufacturing (GS Selwyn et al. J. Vac. Sci. Technol., A 7 (1989) 2758-2765), fusion plasmas (A Yu Pigarov et al. Phys. Plasmas 12 (2005) 122508), as well as dust transport and levitation on airless planetary bodies (M Horanyi. Annu. Rev. Astron, Astrophys. Nor. 34 (1996) 383-418). It has been shown that introducing an electron beam to a dusty surface can release dust particles from surfaces (TE Sheridan et al. J. Geophys. Res. 97 (1992) 2935; TM Flanagan et al. Phys. Plasmas 13 (2006) 123504; X Wang et al. J. Geophys. Res. 115 (2010) A11102). Several theories have been developed to understand possible dust release mechanisms (TM Flanagan et al. Phys. Plasmas 13 (2006) 123504; TE Sheridan et al. Appl. Phys. Lett. 98 (2011) 91501; LCJ Heijmans et al. Phys. Plasmas 23 (2016) 43703). However, none of them could fully explain the laboratory results. Recently, a series of new laboratory experiments (X Wang et al. Geophys. Res. Lett. 43 (2016) 6103-6110; J Schwan et al. Geophys. Res. Lett. 44 (2017) 3059-3065; N Hood et al. Geophys. Res. Lett. 45 (2018) 13,206-13,212; A Dove et al. Planet. Space Sci. 156 (2018) 92-95; NC Orger et al. Adv. Space Res. 63 (2019) 3270-3288) and a simulation work (MI Zimmerman et al. J. Geophys. Res. Planets 121 (2016) 2150-2165) have advanced the understanding of the fundamental mechanisms and characteristics of such electrostatic processes. It has been shown that dust particles can gain enough charge to be released from surfaces not only by being exposed to an electron beam but also by being exposed to ultraviolet (UV) light. Based on these experimental discoveries, a "patched charge model" has been developed (X Wang et al. Geophys. Res. Lett. 43 (2016) 6103-6110). It is briefly described as follows.

Dusty surfaces have a unique feature of microcavities forming between dust particles. As illustrated in FIG. 1, when electrons or photons enter through a small gap and hit the surface patch of a dust particle below the top layer surface (dotted surfaces), secondary electrons or photoelectrons are emitted. A fraction of these emitted electrons is absorbed inside the microcavity and deposits negative charges on the surrounding dust particles (indicated patches). An enormously large electric field is formed across the cavity because of its small size (on the order of microns), resulting a buildup of substantial negative charges on the surrounding particles. The resulting repulsive force between these negatively charged particles is large enough to overcome the particle-particle cohesive or particle-surface adhesive force and the gravitational force, causing release of these dust particles.

It has been shown that single-sized dust particles up to 60 μm in diameter or aggregates as large as 140 μm in diameter can be released from surfaces under exposure to a 120 eV electron beam (X Wang et al. Geophys. Res. Lett. 43 (2016) 6103-6110). In the experiments herein, a series of tests were performed to find the optimized electron beam parameters to effectively shed dust off of surfaces.

Figure 2:
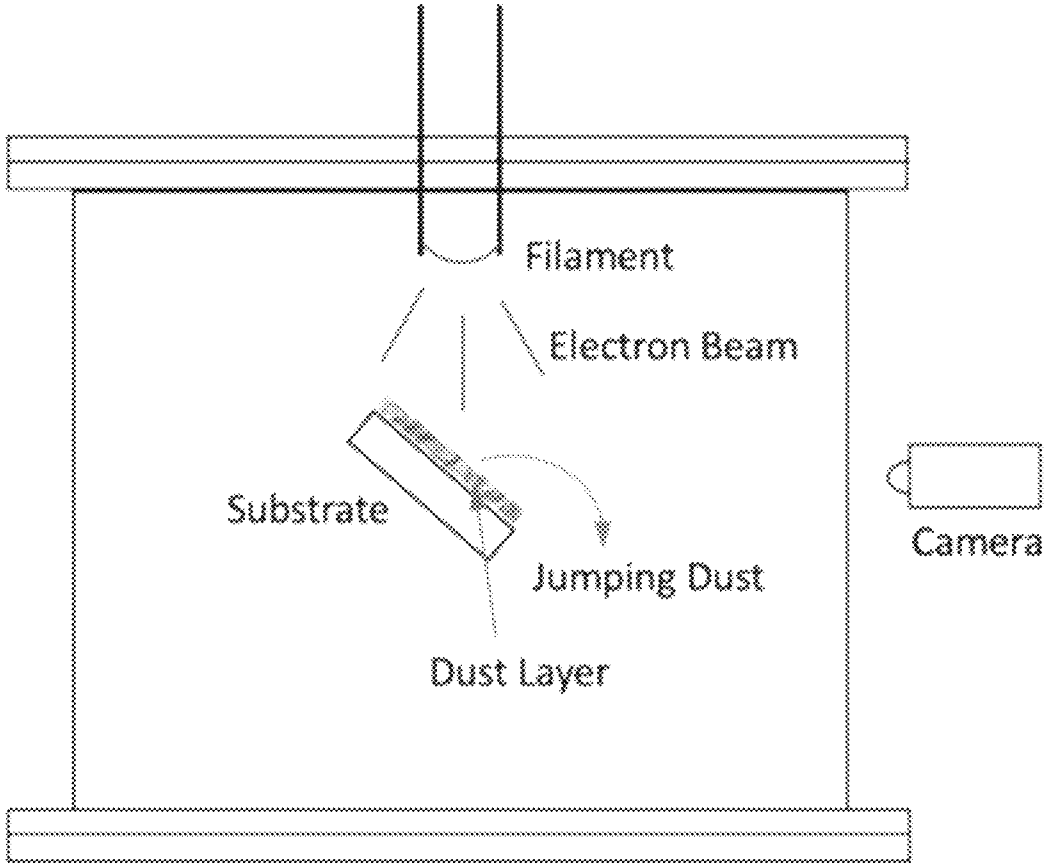
FIG. 2. Schematic of the experimental setup. An electron beam is generated using a negatively biased hot filament. A substrate covered with lunar simulant dust (JSC-1A, ≤25 μm in diameter) is set at 45° relative to the horizontal line and exposed to the beam. Dust jumping off the surface is recorded by a high-speed video camera at 2000 fps. The changes in the surface cleanliness over time are recorded by a regular-speed video camera.
Figure 3:
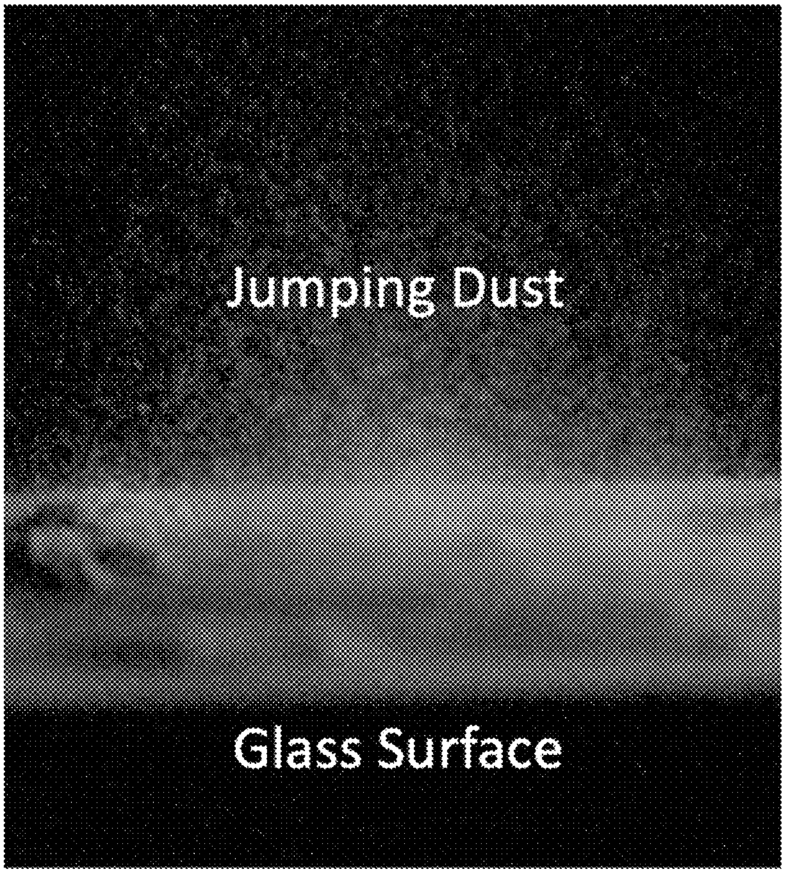
FIG. 3. Dust jumping off a glass surface due to exposure to an electron beam (230 eV, 1.5 $\mu A/cm^2$).

Experimental setup and surface cleanliness analysis method. The experiment was carried out in a 50 cm diameter and 28 cm tall vacuum chamber (FIG. 2). JSC-1A lunar simulant particles ($\rho \sim 2.9 \times 10^3$ kg/m$^3$, <25 μm in diameter) were deposited on a test sample (2.5 cm×5 cm) attached to a substrate. The deposition procedure is described later in this section. The substrate was attached to a shaft rotated to have the substrate surface at 45° relative to the horizontal line. The entire sample surface was approximately uniformly exposed to an electron beam emitted from a negatively biased hot filament mounted on the top of the chamber about 20 cm above the sample surface. In the vacuum condition, the emitted electrons create space charge effects which limit the beam current emitted from the filament. To reach higher beam currents, a low-density plasma was created by feeding in a low pressure (~0.2 mTorr) argon gas that was ionized by the electron beam. For lunar applications this space-charge-limit effect may be minimized by attaching a small gas container to an electron source to slowly leak gas out of the source or having the source closer to the target surface. The beam current density at the sample surface was measured by a disc Langmuir probe (N Hood et al. Geophys. Res. Lett. 45 (2018) 13,206-13,212; X Wang et al. Geophys. Res. Lett. 43 (2016) 525-531). Dust released from the surface was recorded by a high-speed video camera at 2000 fps to demonstrate the shedding process. FIG. 3 shows that a large flux of dust particles jumps off of a glass surface as a result of exposure to the electron beam (230 eV, 1.5 μA/cm$^2$).

Figure 4:
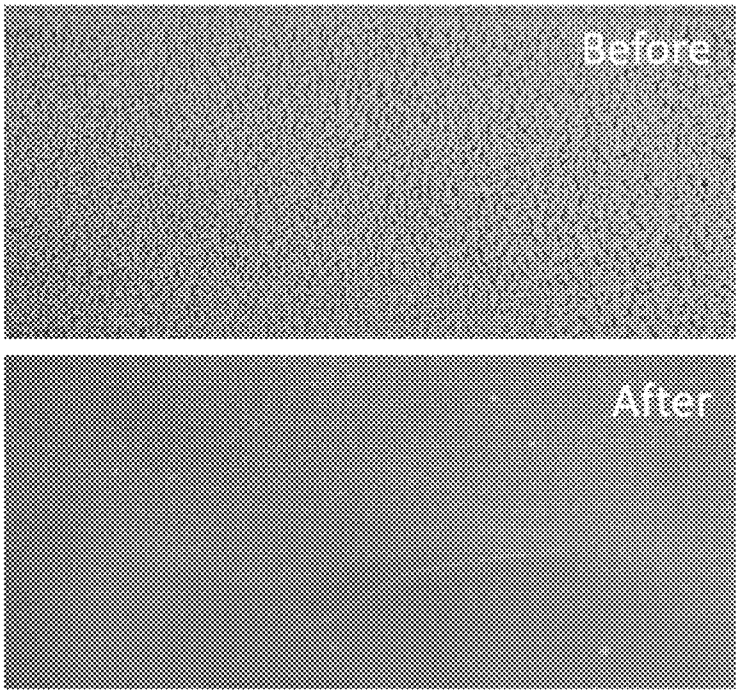
FIG. 4. Images of the glass surface before and after exposure to an electron beam (230 eV, 1.5 $\mu A/cm^2$).

A regular-speed video camera was used to record the initial surface cleanliness and its changes during the dust shedding process. The camera's gamma correction was found to be 1 by calibrating it with the brightness derived from the images. FIG. 4 shows the images of the glass surface before and after the shedding process. The surface cleanliness defines the dust coverage of the test sample surface (the lower cleanliness the higher dust coverage). In the experiments herein, the surface cleanliness C is conveniently defined as:

$$C=(L_s-L_d)/(L_c-L_d)$$

where $L_s$ is the average pixel brightness of the entire sample surface, $L_c$ is the average pixel brightness of the clean surface (no dust), and $L_d$ is the average pixel brightness of the surface fully covered by dust.

In order to create a controlled and consistent dust deposition on the test sample, the following procedure was followed: 1) Load the lunar simulant on a sieve (mesh opening: 25 μm); 2) Tap the sieve to let the simulant fall on the sample surface to create an approximately uniform deposition; and 3) Record an image and analyze the sample surface brightness to define the initial surface cleanliness using the equation above. A focus of the experiments herein was on cleaning the sample surface that is not fully covered by dust (i.e., C>0). However, it was noticed that the deposition does not create a perfect mono-layer of dust on the sample surface. Instead, dust particles can accumulate on top of each other due to interparticle cohesion, forming a multi-layer deposition. The surface cleanliness is therefore correlated with the thickness of the dust layer as well. The lower cleanliness gives both the higher dust coverage and the thicker dust layer. As shown below, the cleaning efficiency is affected by the thickness.

A series of tests were performed to find the optimized electron beam current density and energy. The cleaning effectiveness was tested with different surface materials and thicknesses of the initial dust layer. Each of the tests included 2-4 trials. Their averaged results are shown in FIG. 5-FIG. 9 with the standard deviations as error bars.

Results and Discussion

Figure 5:
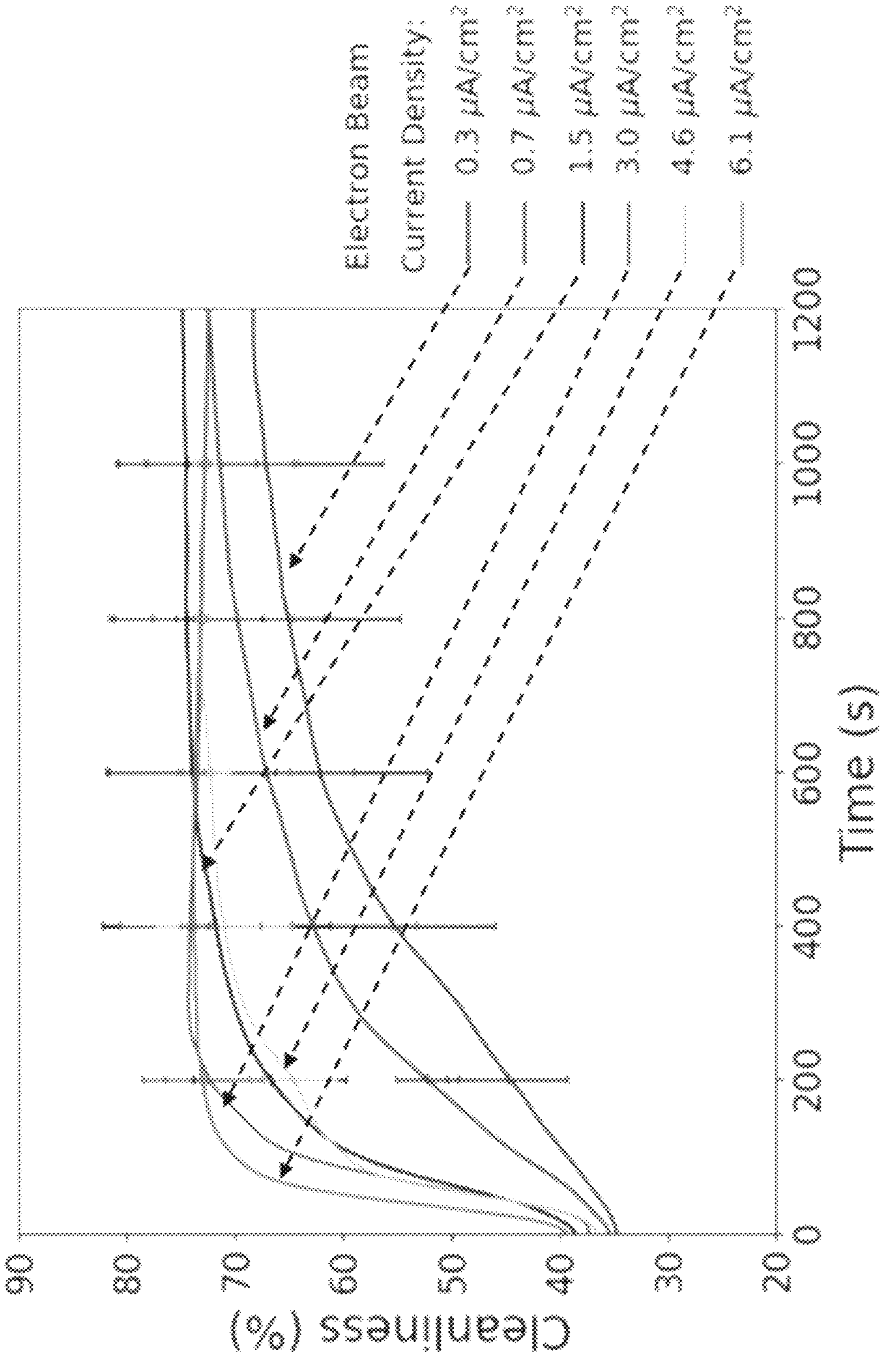
FIG. 5. Temporal cleaning process profiles with different electron beam current densities. The beam energy is 230 eV. The process begins with a medium thick dust layer on a spacesuit sample surface.
Figure 6:
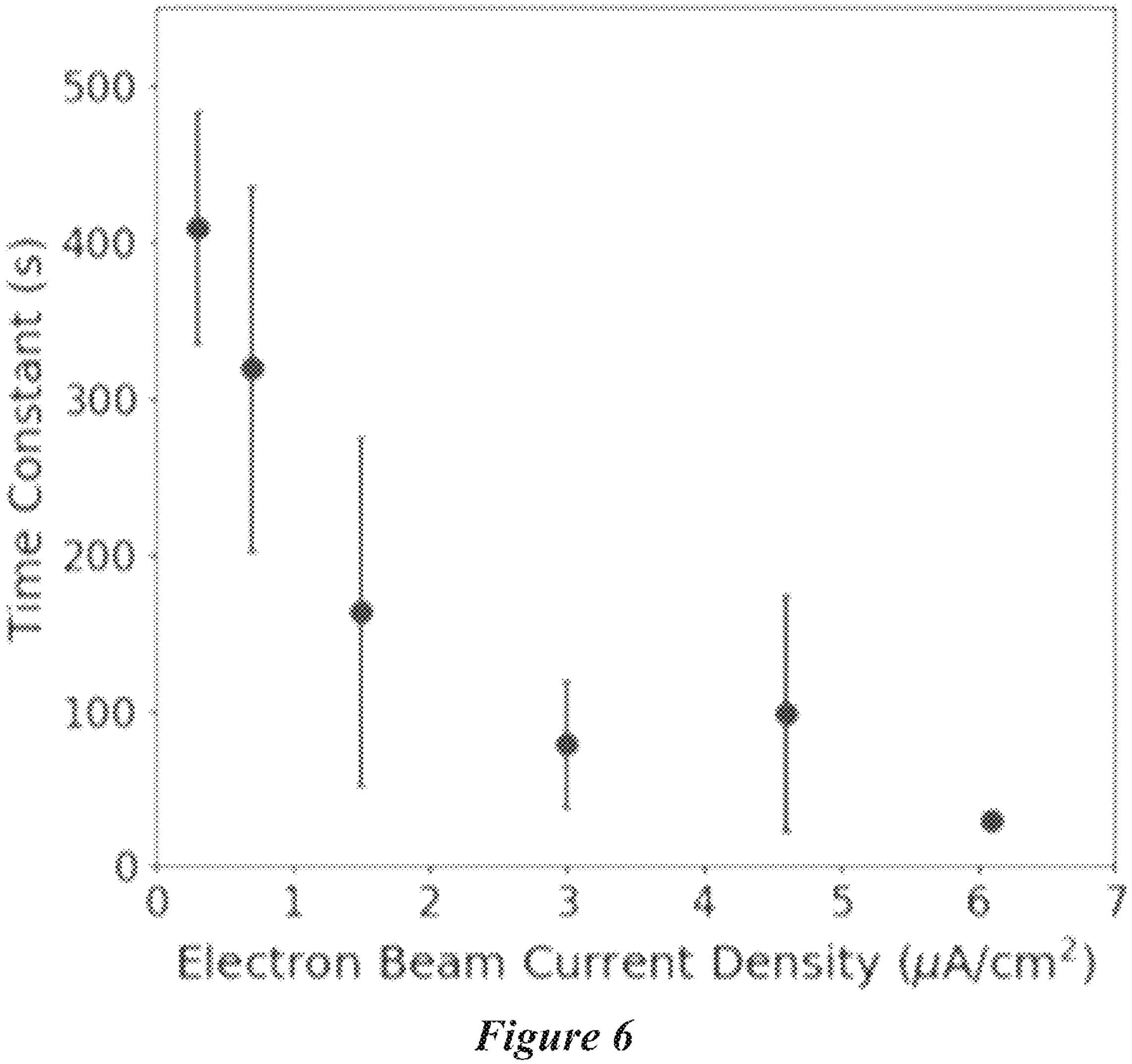
FIG. 6. Time constant of the cleaning process to reach the maximum cleanliness.

Electron beam current density and energy. The optimized beam current density and energy were tested with a spacesuit sample covered by JSC-1A dust with a medium thick layer (C=37.5%). The beam current density was varied between 0.3 and 6.1 μA/cm$^2$. The beam energy was set at ~230 eV which is known to yield a relatively high secondary electron emission for most materials (EC Whipple. Rep. Prog. Phys. 44 (1981) 1197-1250). FIG. 5 shows the cleaning process as a function of time. The maximum cleanliness reached ~75% for all the beam current densities. The time constant (defined as the time for the cleanliness increase to reach 1-1/e 63.2% between the initial and final values) of the cleaning process decreases as the current density increases, as shown in FIG. 6. The time constant tends to reach the plateau ~100 s at the current density between 1.5 and 3 μA/cm$^2$. The results shown in FIG. 6 can be explained as follows. The decrease rate of the time constant for dust cleaning approximately agrees with the increase rate of the electron beam current density because the charging time of dust particles is inversely proportional to the current density. Higher current density results in shorter charging time and thus faster dust release. When the charging process is faster than dust motion, the release rate is limited by dust motion and reaches the plateau.

Figure 7:
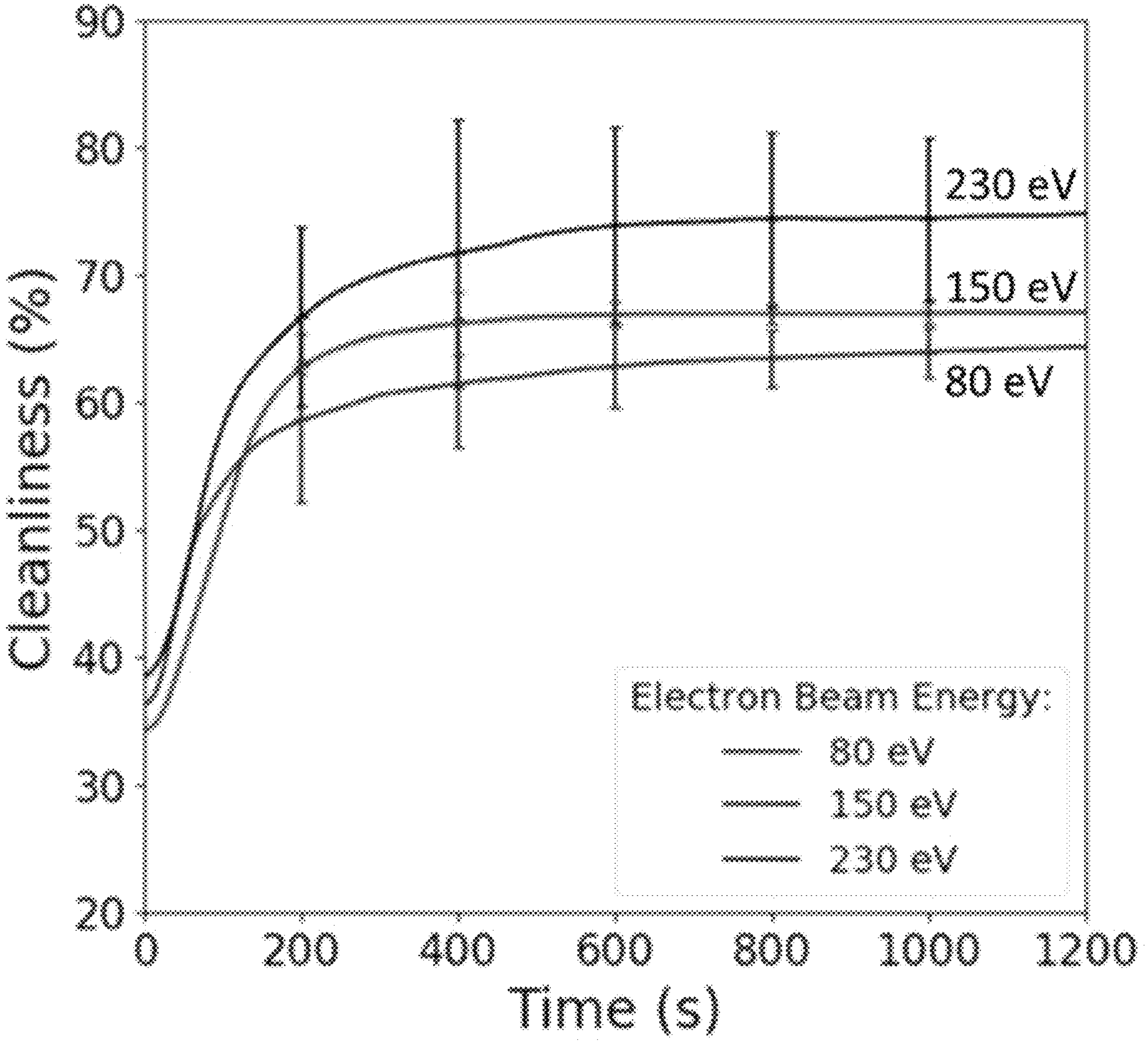
FIG. 7. Temporal cleaning process profiles with different electron beam energies. The beam current density is 1.5 $\mu A/cm^2$. The process begins with a medium thick dust layer on a spacesuit sample surface.

The beam energy dependence was tested between 60 and 400 eV. It was found that the threshold energy to turn on the cleaning process was ~80 eV, which is the minimum energy of incident electrons to generate enough secondary electrons to create a significant microcavity charging effect. FIG. 7 shows the cleaning processes with the beam energy at 80 eV, 150 eV, and 230 eV. It is shown that the cleanliness increases as the beam energy increases. It was found that dust was hardly removed when the beam energy was 400 eV (not shown). It is known that the secondary electron yield rises to a peak value and then falls as the primary electron energy increases (EC Whipple. Rep. Prog. Phys. 44 (1981) 1197-1250). These results may indicate that the secondary electron yield from lunar simulant peaks at the primary electron energy around 230 eV. An electron beam with energy ~230 eV and minimum current density between 1.5 and 3 μA/cm$^2$ is shown to be most effective to shed dust off surfaces for the experiments herein.

Figure 8:
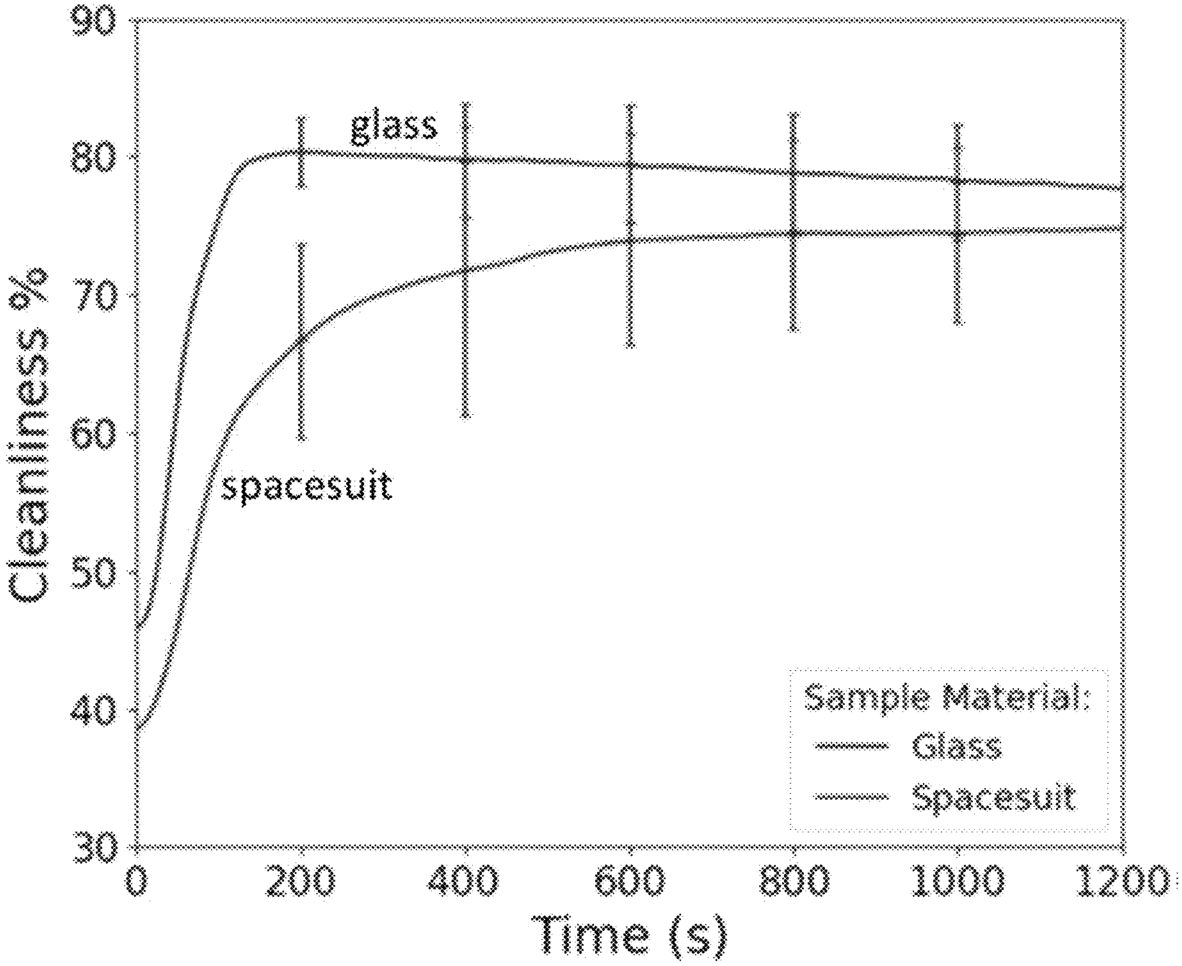
FIG. 8. Temporal cleaning process profiles with different surface materials covered by a medium thick layer of dust. The electron beam energy and current density are 230 eV and 1.5 $\mu A/cm^2$, respectively.

Surface material. Both an Apollo spacesuit sample and a glass plate were tested with the optimized beam energy and current density (230 eV and 1.5 μA/cm$^2$). FIG. 8 shows that the cleanliness for both materials follows a similar trend.

Figure 9:
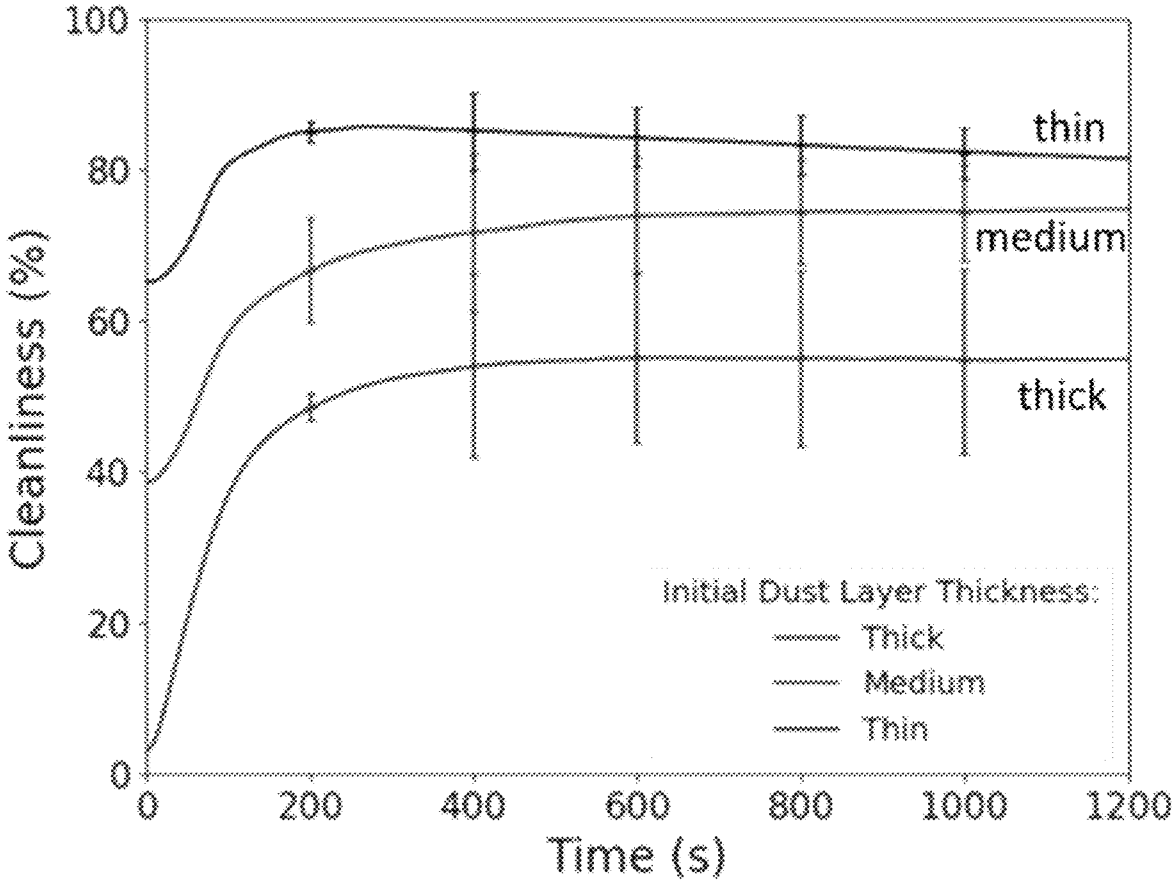
FIG. 9. Temporal cleaning process profiles with different initial thicknesses of the dust layer on the spacesuit sample surface. The electron beam energy and current density are 230 eV and 1.5 $\mu A/cm^2$, respectively.

Dust layer thickness. In this test, the spacesuit sample was covered by a dust layer of three different thicknesses in terms of a cleanliness level: 5%, 40%, and 65%. FIG. 9 shows that the cleanliness varies with the initial dust layer thickness. The thinner dust layer ends up with a higher cleanliness (as high as ~85%). A possible explanation is that in a thicker layer, dust particles below the very top layer are more compact due to gravity, resulting in larger interparticle cohesive forces to be overcome. Such compaction effect on dust release has been shown in previous experiments (N Hood et al. Geophys. Res. Lett. 45 (2018) 13,206-13,212; NC Orger et al. Adv. Space Res. 63 (2019) 3270-3288). On the lunar surface, this effect is expected to be reduced due to its lower gravity. As also suggested above, a hybrid mitigation strategy can be used. For example, an initially thick dust layer can be removed by other methods such as brushing or vibrating followed by the electron beam method to clean the rest of the layer that is relatively thin.

Overall, the measurements show that surfaces covered by a medium to thin layer of fine-sized dust can be cleaned utilizing an electron beam to reach a cleanliness level as high as 75-85% within a relatively short period of time (<1 min). Additionally, charge buildup on surfaces exposed to the electron beam was not observed to lead to any electrostatic discharge in any of these tests.

Conclusions. A method utilizing an electron beam to charge fine-sized dust particles and shed them off of various surfaces as a result of electrostatic forces was demonstrated. This method was based on recent discoveries in electrostatic dust lofting studies. Secondary electrons created on a dusty surface due to exposure to an electron beam can be absorbed inside microcavities between dust particles, causing a buildup of substantial negative charges on the surrounding particles. The repulsive forces between these largely negatively charged particles cause their release from the surface. Surfaces covered by JSC-1A lunar simulant particles (<25 μm in diameter) were tested using an electron beam with different surface materials and thicknesses of the initial dust layer. It was found that the overall cleanliness for a medium to thin dust layer (40-65% initial) can reach 75-85% on a timescale of ~100 s with the optimized electron beam energy ~230 eV and minimum current density between 1.5 and 3 μA/cm$^2$. The cleanliness was found to be similar between a spacesuit sample and a glass plate.

The remaining 15-25% dust coverage was mainly a monolayer of dust particles as shown in FIG. 4. Based on the patched charge model (X Wang et al. Geophys. Res. Lett. 43 (2016) 6103-6110), the emission and absorption of photoelectrons inside microcavities between dust particles can also create large negative charges on them, causing their release as a result of large inter-particle repulsive forces. A dust removal method using a short wavelength UV light can take advantage of this effect.

Example 3—Improvement of the Electron Beam (e-Beam) Lunar Dust Mitigation Technology with Varying the Beam Incident Angle Abstract. Dust hazards are considered to be one of the technical challenges for future lunar exploration. Previously, a dust mitigation technology was introduced utilizing an electron beam to remove dust particles from various surfaces. This technology was developed based on a patched charge model, which shows that the emission and re-absorption of electron beam induced secondary electrons inside microcavities between dust particles can lead to sufficiently large charges on the dust particles, causing their release from the surface due to strong repulsive forces. herein, an improvement in the effectiveness of this technology is demonstrated with varying the beam incident angle on dust-covered sample surfaces by rotating the samples relative to the beam. Due to random arrangements of the microcavities, more of them will be exposed to the beam with various incident angles, thereby causing more dust release from the surface. The cleaning performance is tested against three samples: glass, spacesuit, and a photovoltaic (PV) panel. Lunar simulant (<25 μm in diameter) was deposited onto the sample surfaces such that the initial cleanliness of the samples was 0% (full dust coverage) and 40%. Varying the beam incident angle showed an overall surface cleanliness increase of 10-20% in addition to the cleanliness achieved with a fixed beam angle. The ultimate cleanliness reached 83-92% for the glass and spacesuit samples. The photovoltaic panel coated with $MgF_2$ was shown to be more adhesive to the dust with the maximum cleanliness of 50-63%.

Introduction. Lunar dust has been recognized as an issue for human exploration since the Apollo era. The dust can be stirred up due to robotic and/or human activities or released by natural processes such as micrometeoroid impacts and electrostatic lofting. As learned from the Apollo missions, lunar dust can readily stick to all surfaces, causing damages to spacesuits (R Goodwin, Apogee Books, Apollo 17: The NASA Mission Reports 1 (2002). ON, Canada, 2002), degradation of thermal radiators and optical components (TW Murphy et al. Icarus 208 (2010) 31-35; TW Murphy et al. Icarus 231 (2014) 183-192; JR Gaier et al. 2011, p. 2011. NASA/TM-2011-217231/AIAA-2011-5182; JR Gaier et al. 2011, p. 2011. NASA/TM-2011-217230/AIAA-2011-5183; CM Katzan et al. The Effects of Lunar Dust Accumulation on the Performance of Photovoltaic Arrays, Space Photovoltaic Research and Technology Conference, NASA Lewis Research Center, Cleveland, Ohio, 1991, 1991), and failures of mechanisms (JR Gaier. 2005, p. 2005. NASA/TM-2005-213610). In addition, lunar dust in human living quarters could lead to health risks when inhaled by astronauts (DG Schrunk et al. The Moon: Resources, Future Development and Colonization, Praxis Publishing Ltd., Chichester, 1999, 1999; JT James et al. 2009, p. 2009. NASA-SP-2009-3045). Dust mitigation is needed to ensure the success of future human and robotic exploration, especially the long-term presence on the lunar surface. Different types of lunar dust mitigation technologies have been developed over the past decades (N Afshar-Mohajer et al. Adv. Space Res. 56 (2015) 1222-1241). These technologies include fluidal (e.g., liquid jet, foams or compressed gases) (F Tatom et al. 1967, p. 1967. NASA Technical Report No. TR-792-7-207A, 3-1; RV Peterson et al. Contamination removal by CO2 jet spray, in: Proc. Optical System Contamination: Effects, Measurement, Control II, International Society for Optics and Photonics, 1990, pp. 72-85; K Wood. 1991, p. 1991. NASA-CR-190014), mechanical (e.g., brushing or vibrating) (JR Gaier et al. 2011, p. 2011. NASA/TM-2011-217231/AIAA-2011-5182; JR Gaier et al. 2011, p. 2011. NASA/TM-2011-217230/AIAA-2011-5183), electrodynamic (e.g., the Electrodynamic Dust Shield and a photovoltaic dust removal electrode) (R Sims et al. Proc. ESA—IEEE Joint Meet, Electrostat (2003) 814-821; C Calle et al. 2006, p. 2006. IAC-06-A5.2.07; C Calle et al. J. Electrost. 67 (2009) 89-92; C Calle et al. Acta Astronaut. 69 (2011) 1082-1088; KK Manyapu et al. Acta Astronaut. 137 (2017) 472-481; H Kawamoto et al. J. Electrost. 94 (2018) 38-43; J Jiang et al. Acta Astronaut. 166 (2020) 59-68; J Jiang et al. Acta Astronaut. 165 (2019) 17-24; Y Lu et al. Smart Mater. Struct. 28 (2019), 085010) and passive (e.g., surface modification for reduced adhesion) (JR Gaier et al. 2011, p. 2011. NASA/TM-2011-217230/AIAA-2011-5183; A Dove et al. Planet. Space Sci. 59 (2011) 1784-1790; JR Gaier. Icarus 221 (2012) 167-173; JR Gaier et al. AIAA Aerospace Sciences Meeting, 2012, p. 2012. AIAA-2012-0875) methods. These methods have both advantages and disadvantages, and their selection depends on the dust characteristics, surface properties, and application scenarios.

As discussed above, a technology utilizing an electron beam (e-beam) to remove dust particles from various surfaces has been developed (B Farr et al. Acta Astronaut. 177 (2020) 405-409). This e-beam technology aims to clean fine lunar dust (smaller than a few tens of microns in diameter), which has been discovered from the returned Apollo samples (JC Graf. Lunar soils grain size catalog, NASA Ref. Publ. 1265 (1993); J Park et al. J. Aero. Eng. 21 (2008) 266-271). Finer dust particles are expected to be "stickier" due to their stronger adhesive and electrostatic forces, causing their mitigation to be more challenging. Therefore, finer lunar dust is expected to pose a higher risk to human and robotic exploration. The e-beam technology was demonstrated using lunar simulant <25 μm in diameter. Optimal beam parameters have been found to be ~230 eV beam energy and >1.5 $\mu A/cm^2$ current density. Both spacesuit and glass sample surfaces with 40% initial cleanliness (i.e., 60% dust coverage) were shown to achieve 75-85% cleanliness on a beam exposure timescale of ~100 s (B Farr et al. Acta Astronaut. 177 (2020) 405-409).

Earlier work has shown that introducing an electron beam to a dust-covered surface can cause dust particles to be charged and released from the surface due to electrostatic forces (TE Sheridan et al. J. Geophys. Res. 97 (1992) 2935; TM Flanagan et al. Phys. Plasmas 13 (2006) 123504; X Wang et al. J. Geophys. Res. 115 (2010). A11102). However, explaining this dust release mechanism was not possible using previous charging theories (TE Sheridan et al. J. Geophys. Res. 97 (1992) 2935; TM Flanagan et al. Phys. Plasmas 13 (2006) 123504; TE Sheridan et al. Appl. Phys. Lett. 98 (2011), 091501; LCJ Heijmans et al. Phys. Plasmas 23 (2016), 043703). A recently developed patched charge model has provided a new insight into the fundamentals of the dust charging and release process (X Wang et al. Geophys. Res. Lett. 43 (2016) 6103-6110). The model suggests that microcavities are formed between dust particles, and the emission and re-absorption of secondary electrons generated by energetic electron impacts inside the microcavities can result in a buildup of large negative charges on the surrounding dust particles due to an intense electric field created across a small cavity. Subsequent strong electric repulsive forces between these negatively charged particles lead to their release from the surface. This model is supported by several follow-up experiments (X Wang et al. Geophys. Res. Lett. 43 (2016) 6103-6110; J Schwan et al. Geophys. Res. Lett. 44 (2017) 3059-3065; N Hood et al. Geophys. Res. Lett. 45 (2018), 13,206-13,212; A Dove et al. Planet. Space Sci. 156 (2018) 92-95; NC Orger et al. Adv. Space Res. 63 (2019) 3270-3288; A Carroll et al. Icarus 352 (2020) 113972). Based on this patched charge model, the e-beam dust mitigation technology was developed and used in a well-controlled manner (B Farr et al. Acta Astronaut. 177 (2020) 405-409).

Figure 10:
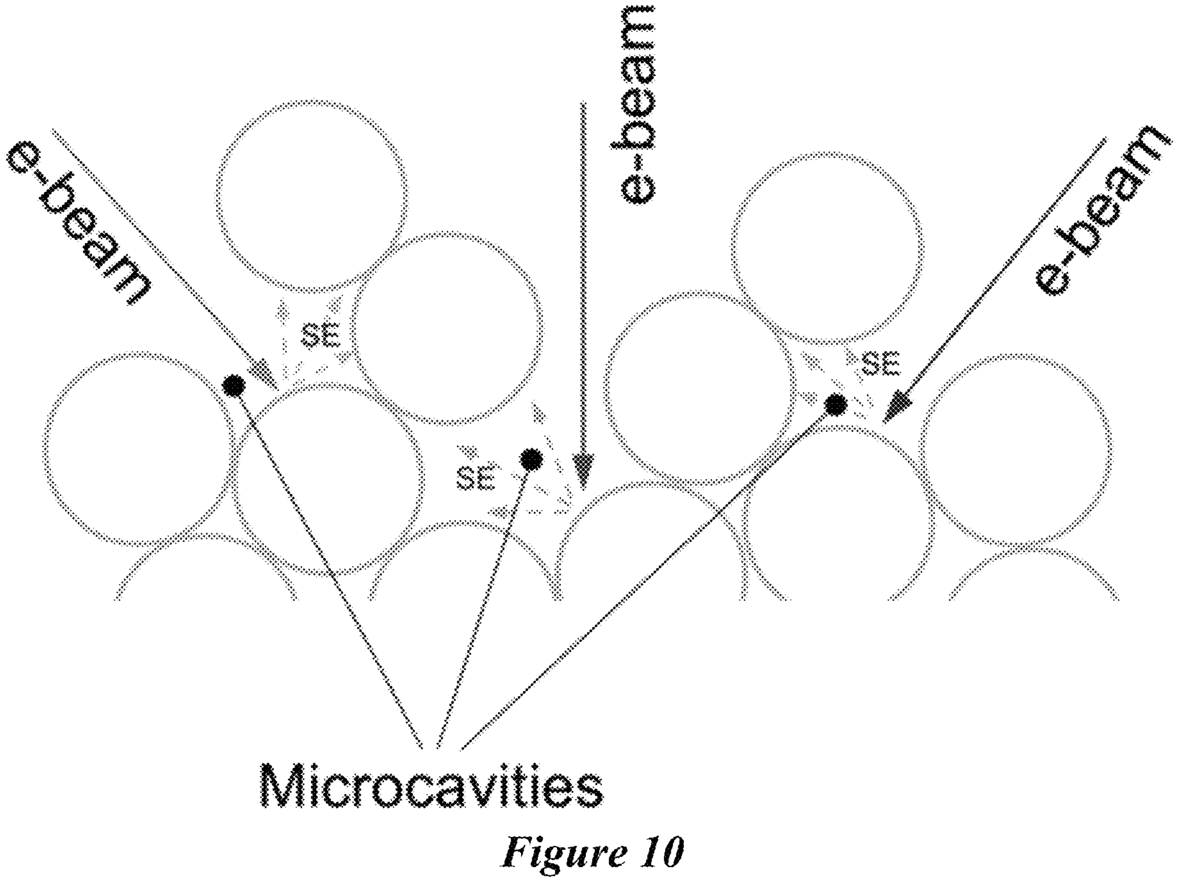
FIG. 10. Schematic of microcavity configurations as an example. Each microcavity can only allow an electron beam with a particular angle to enter, generating secondary electrons (SE) inside the microcavity. The secondary electrons deposit and accumulate large negative charges on the surfaces of the surrounding dust particles of each microcavity, causing them to repel each other and be released from the surface (X Wang et al. Geophys. Res. Lett. 43 (2016) 6103-6110). Varying the beam angle allows more microcavities to be exposed to the beam and subsequently causes more dust to come off the surface.

Herein, an improvement in the effectiveness of the e-beam technology described above is demonstrated. In the physical description of the patched charge model, microcavities can be randomly arranged between dust particles such that their openings are oriented in different directions (FIG. 10). Only electron beams with particular incident angles can reach into the corresponding microcavities, as illustrated in FIG. 10. Thus, it is hypothesized that varying the electron beam incident angle relative to a dust-covered surface can expose more microcavities to the beam, thereby causing more dust particles to be sufficiently charged by beam-induced secondary electrons and released from the surface (X Wang et al. Geophys. Res. Lett. 43 (2016) 6103-6110).

This hypothesis was tested and confirmed in experimental demonstrations in which the beam incident angle was varied by rotating the sample surfaces relative to the beam. The following sections show the experimental method and results on the improvements of the cleaning effectiveness in addition to the samples being cleaned at a fixed beam incident angle (B Farr et al. Acta Astronaut. 177 (2020) 405-409).

Figure 11:
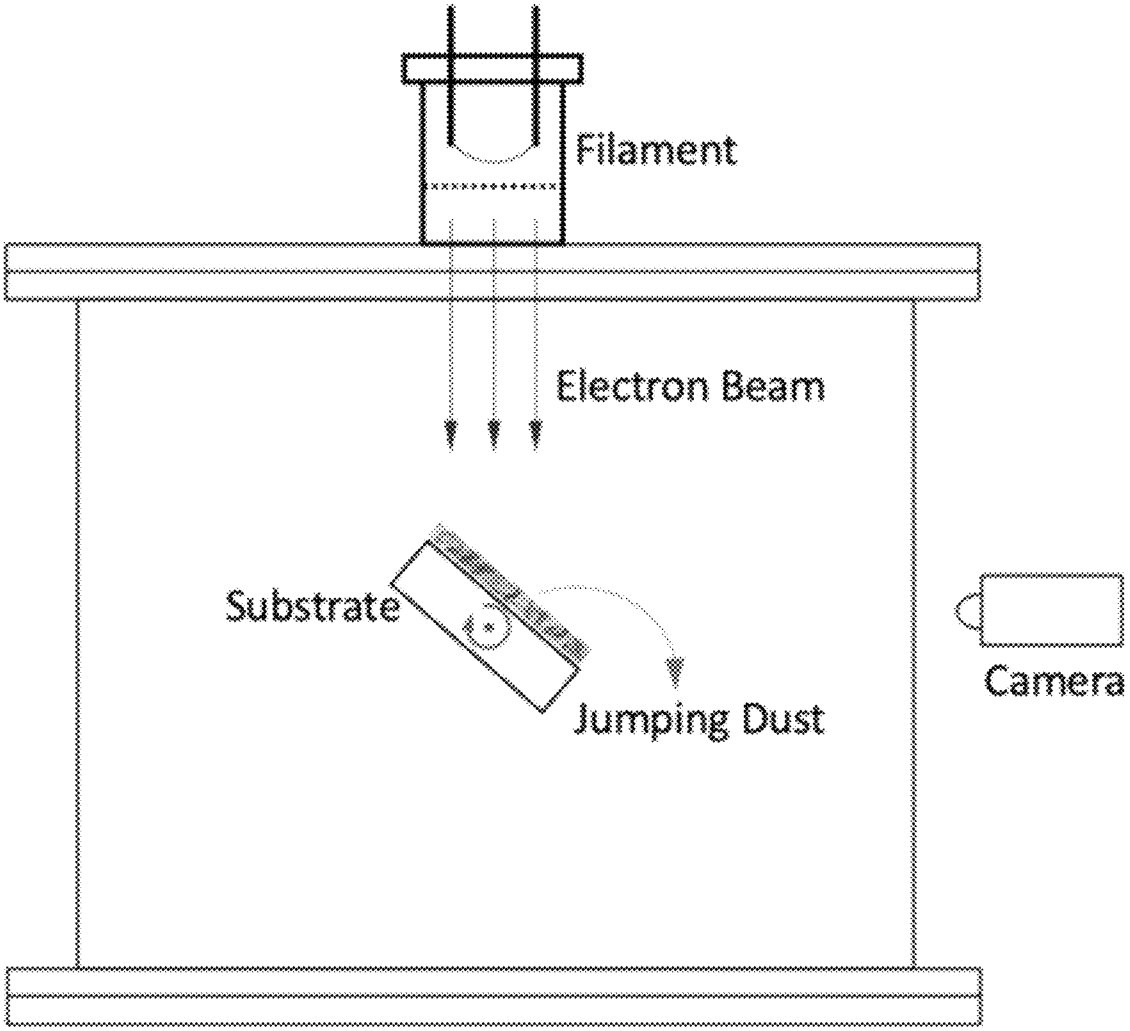
FIG. 11. Schematic of the experimental setup. An electron beam is generated using a negatively biased hot filament on the top of the chamber. A grounded grid is installed a few millimeters below the filament to create an electric field to accelerate the emitted electrons. For all the tests, the electron beam energy and current density are 230 eV and 1.5 $\mu A/cm^2$, respectively. Samples are attached to a substrate and deposited with lunar simulant (JSC-1, <25 μm in diameter). The substrate is attached to a shaft that is rotated at a rate of 6 rpm (circular arrow) by a motor. A video camera is used to record cleanliness changes of the sample surface over the course of the cleaning process.
Figure 12:
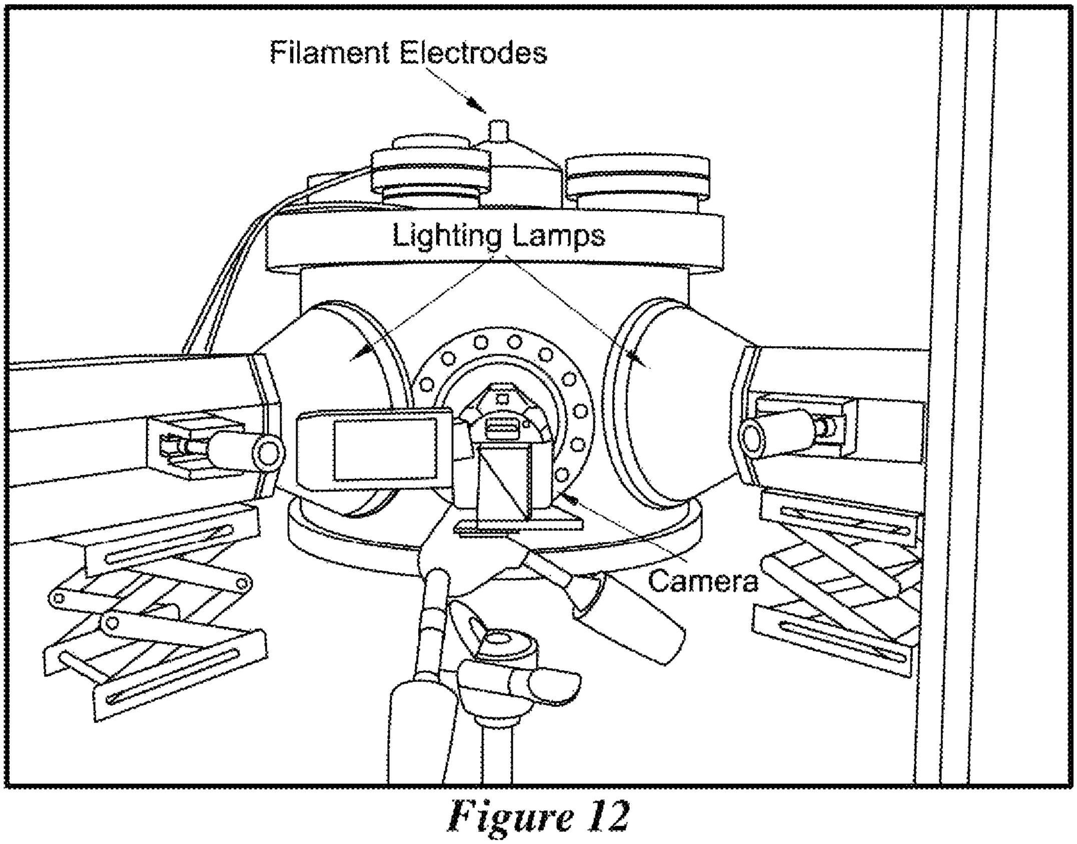
FIG. 12. Photograph of the experimental chamber setup.
Figure 13:
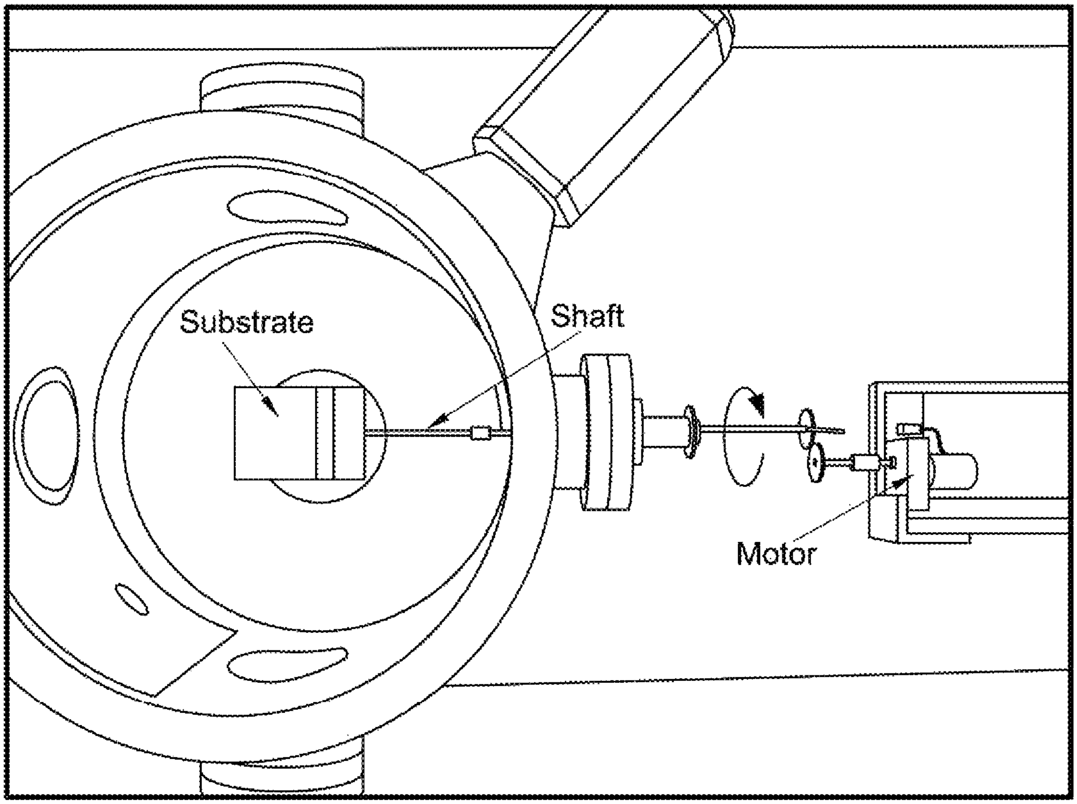
FIG. 13. Photograph of the experimental chamber setup.

Experimental setup and method. The experiment was carried out in a 50 cm diameter and 28 cm tall vacuum chamber (FIG. 11-FIG. 13). JSC-1 lunar simulant ($\rho \sim 2.9 \times 10^3$ kg/m$^3$, <25 μm in diameter) was uniformly deposited on a test sample (2.5 cm×5 cm) attached on a substrate at the end of a shaft. The deposition procedure is described in detail above. The sample surface was exposed to an electron beam emitted from a negatively biased hot filament mounted on the top of the chamber. The beam at the source was ~5 cm diameter and ~20 cm above the sample surface, creating an approximately uniform beam spot on the sample surface. The substrate shaft was connected to a motor that continuously rotates the sample at a slow rate of 6 rpm such that the electron beam is incident on the sample surface at angles between 0° and 180°. As shown in FIG. 11, the electron beam source was modified from a prior configuration (B Farr et al. Acta Astronaut. 177 (2020) 405-409) by installing a grounded grid a few millimeters below the filament to create an electric field to accelerate emitted electrons from the filament. This electric field eliminates the space charge effect near the filament, creating high beam currents without the need of a plasma, which was generated with argon gas at a neutral pressure of ~0.2 mTorr in prior work (B Farr et al. Acta Astronaut. 177 (2020) 405-409). The beam energy and current density at the sample surface were 230 eV and 1.5 μA/cm$^2$, respectively, which are the optimized parameters for an effective cleaning process (B Farr et al. Acta Astronaut. 177 (2020) 405-409). A regular-speed video camera was used to record the initial surface cleanliness and its changes throughout the cleaning process.

As described in prior work (B Farr et al. Acta Astronaut. 177 (2020) 405-409), the surface cleanliness defines the dust coverage of the test sample surface (the lower the cleanliness the higher the dust coverage). In these experiments, the surface cleanliness C is conveniently defined as (B Farr et al. Acta Astronaut. 177 (2020) 405-409):

$$C=(L_s-L_d)/(L_c-L_d)$$

where $L_s$ is the average pixel brightness of the sample surface at a certain point during the cleaning process, $L_c$ is the average pixel brightness of the clean surface (no dust), and $L_d$ is the average pixel brightness of the surface fully covered by dust. All images were taken through the same vacuum chamber glass window with same lighting conditions to ensure the imaging consistency throughout the cleaning process.

The effect of varying the beam incident angle on dust removal was tested to verify the hypothesis described above. As in prior work (B Farr et al. Acta Astronaut. 177 (2020) 405-409), a dust-covered sample surface was initially positioned at 45° to the electron beam and underwent the dust removal process until the process stopped. The sample was then rotated ~10°. Dust release was revived and then died down as shown from motions of dust jumping off the surface recorded using a high-speed video camera at 2000 fps. This process was repeated with the sample rotated to different angles, showing that variations of the beam incident angle cause more dust to come off the surface. This observation shows agreement with the hypothesis.

As a control, rotation for all sample surfaces, including the ones with full dust coverage (i.e., 0% cleanliness), without turning on the electron beam were also tested. No noticeable dust falling off the surface due to gravity and rotation-caused vibration was found.

It is noted that rotation was used to vary the relative angle between the sample surface and the electron beam due to its relatively easy implementation for lab testing. For lunar applications and other practical applications, instead of rotation, a set of electron beam sources can be arranged at different angles, or a movable or portable beam source can be pointed at various angles relative to a surface area being cleaned to maximize the cleaning performance.

A full cleaning process was performed in two steps. First the sample surface was held stationary at 45° relative to the electron beam until the cleaning process stopped, then the rotation started and continued until the maximum cleanliness was reached. Additional cleanliness improvements were observed by comparing the results between the first and second steps. Periodically during rotation, the sample surface was stopped at 45° to take images for consistent data analysis.

Three sample materials were tested, including glass, spacesuit, and a photovoltaic (PV) panel. The spacesuit material was Apollo-era fabric, obtained in 2005 from Johnson Space Center. The glass and spacesuit materials were used in prior work with a fixed sample position at 45° relative to the electron beam. The photovoltaic panel is a new sample tested in this experiment. The photovoltaic panel surface is coated with a layer of $MgF_2$, which is an anti-reflective material. Each of the sample surfaces was tested with two different initial cleanliness levels: 0% (full dust coverage) and 40%. As described previously (B Farr et al. Acta Astronaut. 177 (2020) 405-409), the cleanliness level also correlates to the thickness of the dust layer as dust likely clumps together and accumulates multiple layers during its deposition. The lower surface cleanliness corresponds to a thicker layer of dust and vice versa. It was shown that the dust layer thickness is expected to affect cleaning results (B Farr et al. Acta Astronaut. 177 (2020) 405-409). Each of the tests included 3-4 trials, and their averaged results are shown in FIG. 14-FIG. 17 with the standard deviations as error bars.

Results and discussion. FIG. 14-FIG. 17 show the cleanliness as a function of time as both cleaning steps were completed for three samples. The sample surfaces were tested with two initial cleanliness levels of 0% and 40%, which also correspond to thick and thin dust layers, respectively.

Figure 14:
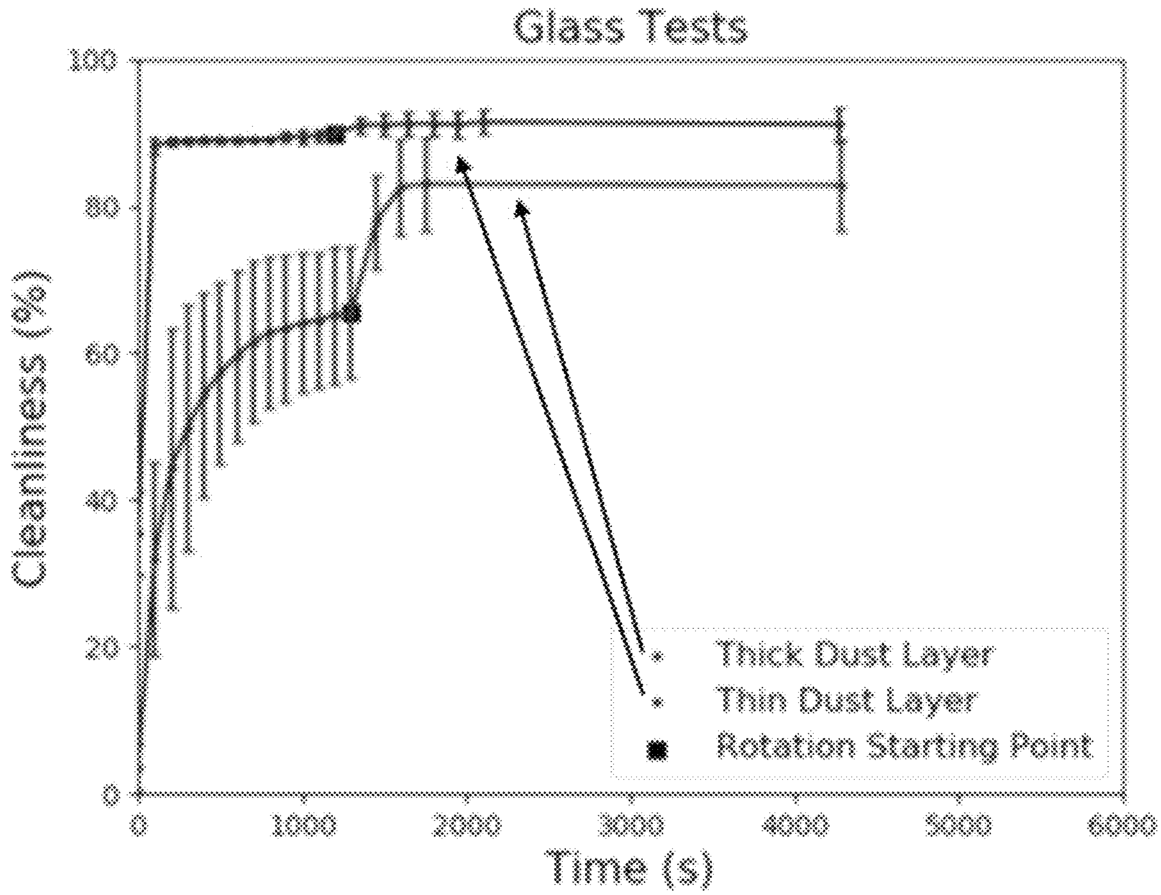
FIG. 14. The cleanliness as a function of time for a glass sample with 0% (full dust coverage) and 40% initial cleanliness, corresponding to thick and thin initial dust layers, respectively. The cleaning process started with the sample held stationary 45° relative to the electron beam followed by rotation as indicated by black squares.
Figure 15:
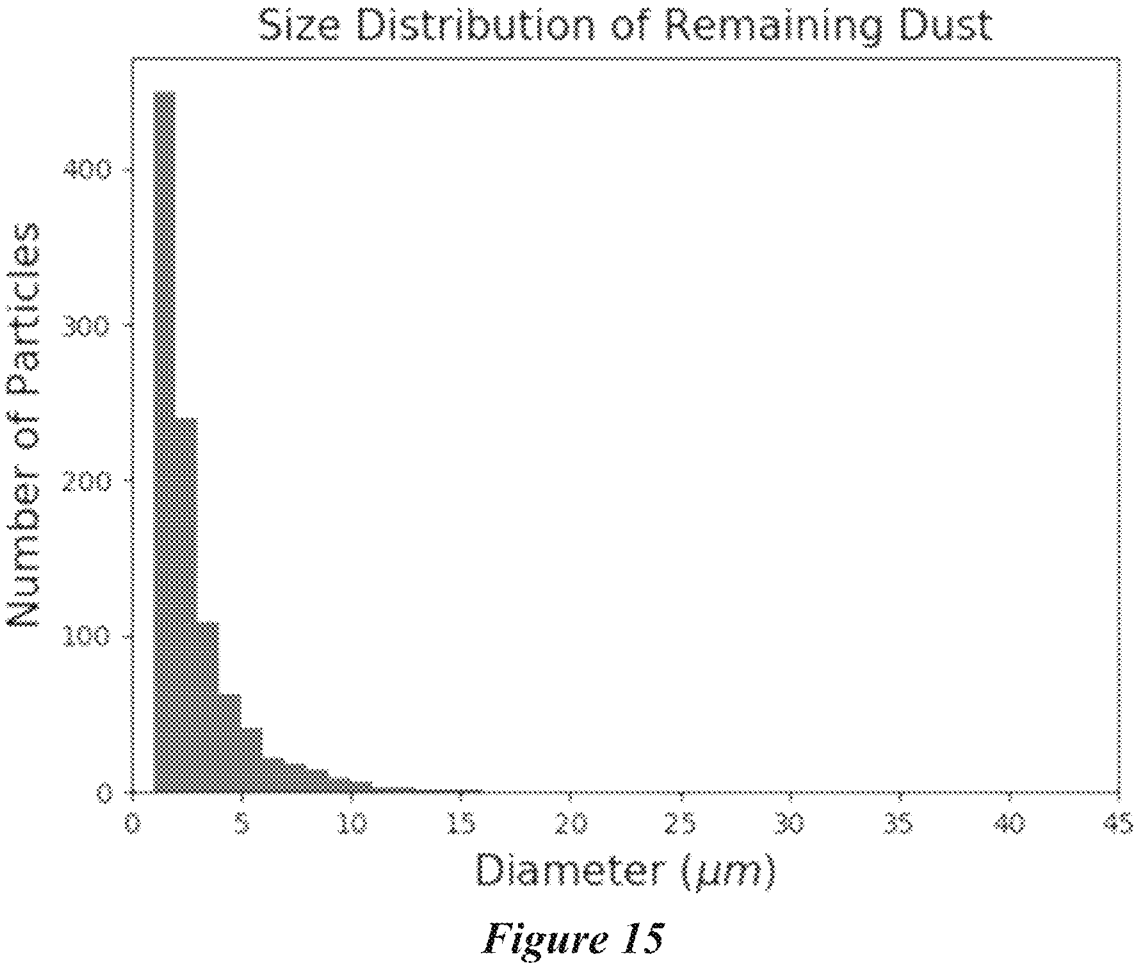
FIG. 15. Size distribution of remaining dust particles after the full cleaning process. It shows that the remaining dust particles were the finer ones <10 μm, and the larger ones between 10 and 25 μm were mostly removed.

In FIG. 14, a glass sample fully covered by dust (i.e., 0% cleanliness) is shown to reach ~65% cleanliness while the sample was held stationary, and the subsequent rotation of the sample increased the cleanliness to ~85%, showing a ~20% improvement. The glass sample starting with 40% cleanliness reached as high as ~88% cleanliness while the sample was held stationary, and the subsequent rotation only yielded an additional 4% to give an overall cleanliness of ~92%. The size distribution of remaining dust particles after the full cleaning process was analyzed by placing the glass sample under a microscope. FIG. 15 shows that the remaining dust particles are mostly smaller ones with sizes <10 μm. Their cumulative cross-section covered ~9% of the total analyzed area, meaning that the surface cleanliness is ~91%, in agreement with the brightness analysis results.

Figure 16:
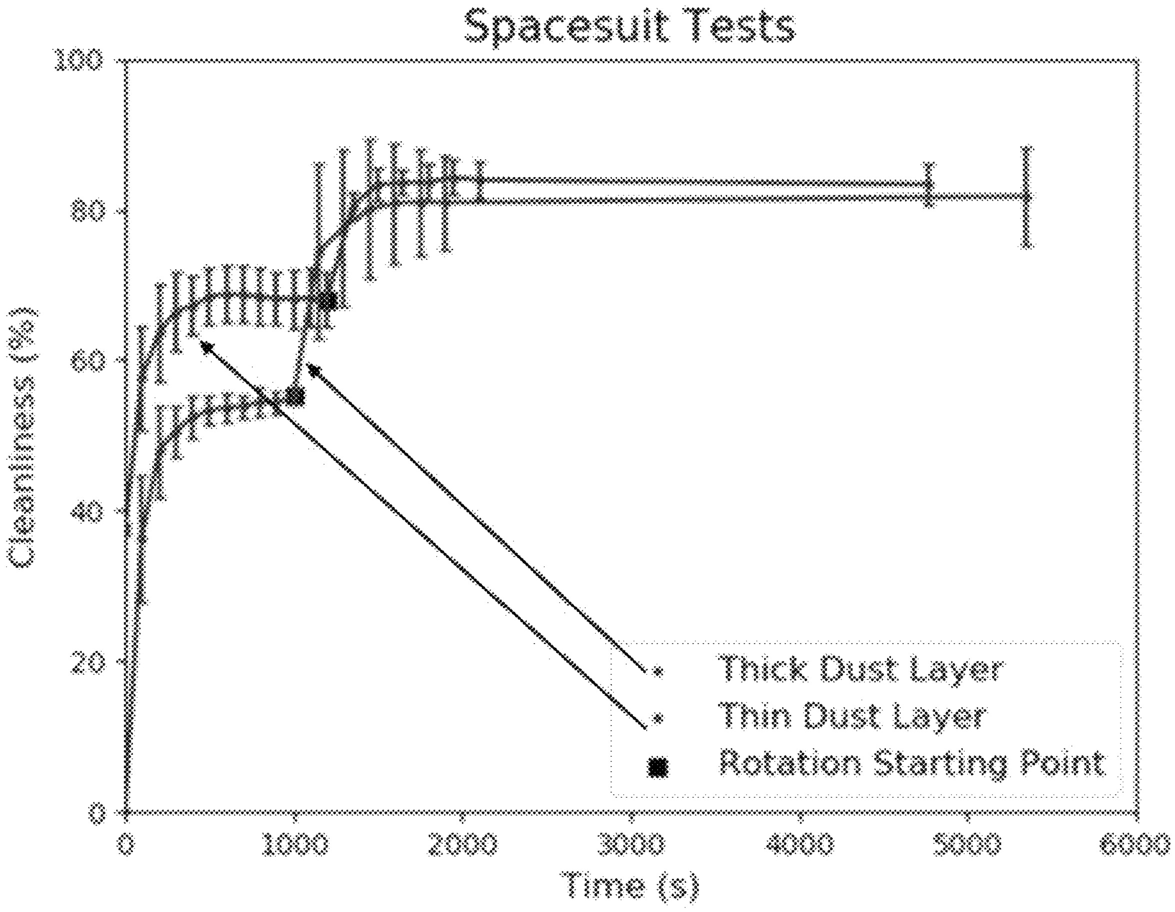
FIG. 16. The cleanliness as a function of time for a spacesuit sample. The initial surface cleanliness levels and corresponding thicknesses of the dust layers, as well as the cleaning procedure were the same as described in FIG. 14-FIG. 15.

FIG. 16 shows that the cleanliness of a spacesuit sample starting with 0% and 40% reached ~53% and ~67%, respectively, after cleaning with the sample being held stationary. Rotating the sample increased the cleanliness to ~83% in both cases, resulting in 16-30% improvements.

The significant improvements by rotation, for the spacesuit surface, may be related to its rough surface morphology. The woven fabric has small pocket-like features. On the one hand, these features can trap dust particles. On the other hand, microcavities can be formed between the dust particles and pockets, allowing more dust being sufficiently charged and released when the beam is directed at various angles to reach into these cavities.

Figure 17:
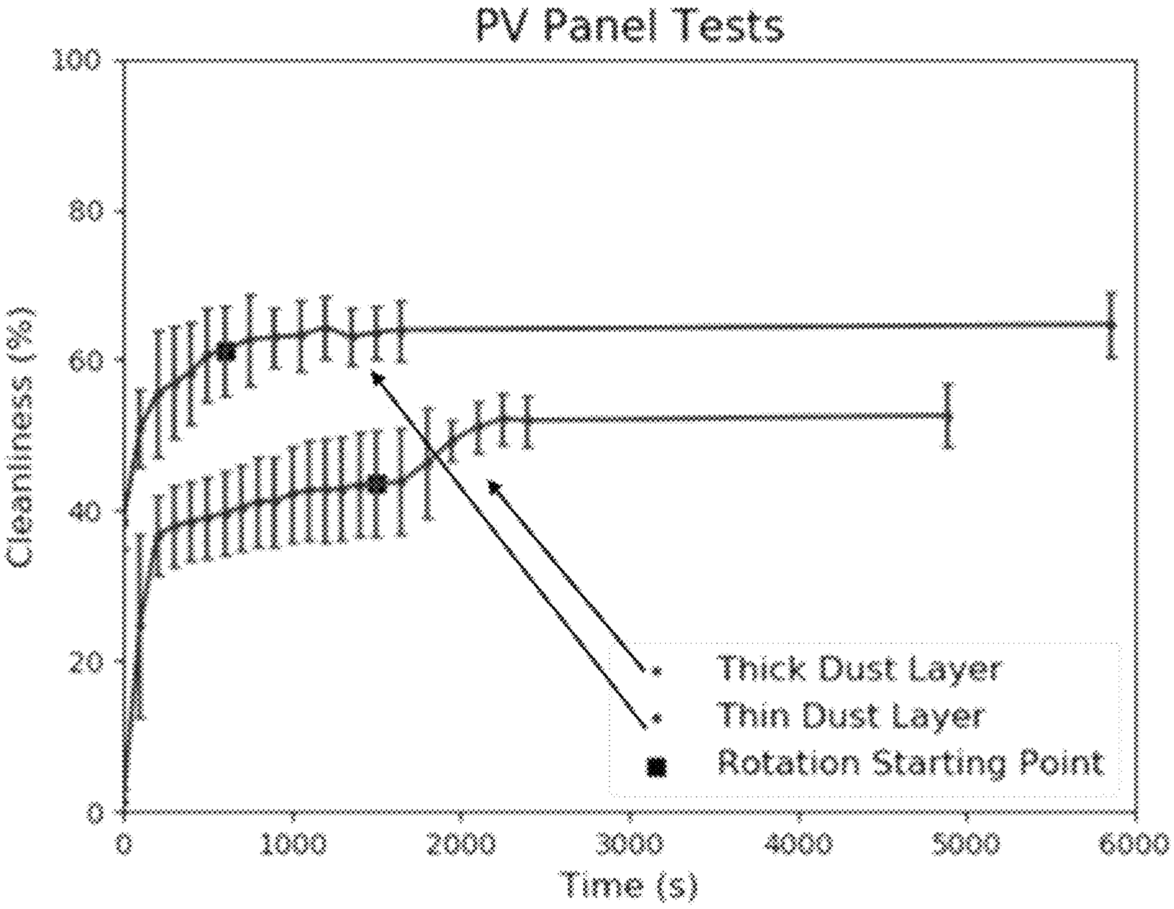
FIG. 17. The cleanliness as a function of time for a photovoltaic panel sample. The initial surface cleanliness levels and corresponding thicknesses of the dust layers, as well as the cleaning procedure were the same as described in FIG. 14-FIG. 15.

FIG. 17 shows that a photovoltaic panel with full dust coverage (i.e., 0% cleanliness) reached ~40% cleanliness after exposure to the electron beam, and rotating the sample increased the overall cleanliness to ~50%, showing a ~10% improvement. The sample with 40% cleanliness achieved ~63% cleanliness after beam exposure, rotating the sample yielded little to no additional cleaning. The photovoltaic panel was found to be more difficult to be cleaned than the glass and spacesuit samples, indicating that its outmost layer of $MgF_2$ is more adhesive to dust.

The results show that, for most cases, rotating the samples relative to the electron beam can result in removal of more dust to increase the surface cleanliness by 10-20% on average in addition to the cleanliness reached with the samples being held stationary. This effect was mostly noticeable during the spacesuit tests. Both the stationary and rotating cleaning processes achieved their maximum cleanliness levels on the timescale of a few minutes or less. Additionally, the thickness of initial dust layers showed an effect on the cleaning performance, which is more pronounced for the samples held at a fixed angle to the beam. Similar to the results shown previously (B Farr et al. Acta Astronaut. 177 (2020) 405-409), thicker layers were found to result in the lower final cleanliness, possibly due to their higher dust compactness as a result of gravity and the subsequently decreased microcavity charging efficiency. It was shown in this work that varying the beam incident angle reduces the effect of the initial dust layer thickness on the overall cleaning performance.

Conclusion. An improvement of the e-beam dust removal technology was demonstrated by varying the beam incident angle on sample surfaces by rotating the samples relative to the beam. The idea was based on the patched charge model (X Wang et al. Geophys. Res. Lett. 43 (2016) 6103-6110). Microcavities are expected to be randomly organized between dust particles, and variations of the beam incident angle will allow more microcavities to be exposed to the beam, thereby causing more dust particles to be sufficiently charged by beam-induced secondary electrons and subsequently released from the surface due to strong repulsive forces. It was recorded that additional dust came off the surface as the beam incident angle was changed.

The cleaning performance was tested against three samples: glass, spacesuit and a photovoltaic panel. Lunar simulant <25 μm in diameter was deposited on the surfaces of the samples with initial cleanliness levels of 0% (full dust coverage) and 40%, which also correspond to thick and thin dust layers. The cleaning began with the sample surfaces held stationary at 45° relative to the beam, followed by rotation to vary the beam incident angle. It was shown that for most cases varying the beam incident angle increased the final cleanliness by 10-20% on average after the samples were cleaned at a fixed beam angle. This effect was most significant for the spacesuit surface. It was shown that thicker dust layers reached a lower final cleanliness than thinner layers, as also demonstrated in prior work (B Farr et al. Acta Astronaut. 177 (2020) 405-409), but their differences were reduced after cleaning with varying the beam incident angle. The overall maximum cleanliness reached 83-92% for the glass and spacesuit samples. The photovoltaic panel coated with $MgF_2$ was demonstrated to be more adhesive to the dust with the maximum cleanliness of 50-63%. For lunar applications, one can either configure multiple e-beam sources with different beam angles or have a movable or portable beam source to point at various angles to maximize the dust cleaning effectiveness. Additionally, a variety of samples, including Kapton, Indium-tin-oxide (ITO), camera lenses and metals can be tested to examine the versatility of this technology.

Example 4—Dust Removal from a Variety of Surface Materials with Multiple Electron Beams Abstract. Dust mitigation is one of the technical challenges to overcome for future lunar surface exploration. In previous work, an electron beam (e-beam) mitigation technology was introduced to remove dust particles from protected surfaces through an electrostatic mechanism developed based on a Patched Charge Model. This model shows that the emission and reabsorption of e-beam induced secondary electrons inside microcavities between dust particles can result in large charges on the particles and their subsequent ejections from the surface due to strong repulsive forces. It was shown that, due to random orientations of microcavities, varying the e-beam incident angle by rotating the sample surface can cause more microcavities to be exposed, thereby improving the cleaning effectiveness. herein, a new configuration to implement varying the beam angle is presented and tested. Here multiple e-beam sources are aimed at different angles simultaneously at a sample surface that is fixed in place. A large variety of surface material samples are tested to demonstrate the e-beam technology's application scenarios, including both insulating samples (spacesuit, glass, a photovoltaic (PV) panel, Kapton tape, thermal blanket and anodized aluminum) and a conducting sample (aluminum). It is shown that the multiple e-beam source configuration improves cleaning effectiveness by 10-30% in comparison to a single fixed beam and sample. Most of the insulating samples achieve 80-90% cleanliness after only the 2-3 minute beam exposure, except for the photovoltaic panel that shows 50% cleanliness. The conducting aluminum sample shows relatively low cleanliness at 35-45% likely due to the attractive Coulomb mirror force between the charged dust and aluminum surface. Finally, various e-beam configurations are suggested depending on application scenarios.

Introduction. Lunar dust interfering with human exploration was first reported by the Apollo missions. Fine dust readily sticks to all surfaces of exploration systems, causing a series of issues, including damage to spacesuits due to the abrasiveness of lunar dust (R Goodwin, Apollo 17: The NASA Mission Reports, vol. 1. Apogee Books (2002), ON, Canada, 2002), degradation of retroreflectors (TW Murphy et al. Icarus 208 (2010) 31-35; TW Murphy et al. Icarus 231 (2014) 183-192), thermal radiators (JR Gaier et al. NASA/TM-2011-217231/AIAA-2011-5182 (2011), 2011; JR Gaier et al. NASA/TM-2011-217230/AIAA-2011-5183 (2011), 2011) and solar panels (CM Katzan et al. The effects of lunar dust accumulation on the performance of photovoltaic arrays, Space Photovoltaic Research and Technology Conference, NASA Lewis Research Center, Cleveland, Ohio (1991), 1991), interference with hatch seals and Extravehicular Activity (EVA) systems (JR Gaier, NASA/TM-2005-213610 (2005), 2005), and posing health risks if dust brought back to living quarters is inhaled by astronauts (DG Schrunk et al. The Moon: Resources, Future Development and Colonization, Praxis Publishing Ltd., Chichester (1999), 1999; JT James et al. NASA-SP-2009-3045 (2009), 2009).

Several dust mitigation technologies have been studied or developed over the past decades. These technologies can be categorized into passive and active technologies (N Afshar-Mohajer et al. Advances in Space Research 56 (2015) 1222-1241). Passive technologies do not require external forces to mitigate dust. Generally, these technologies apply coatings (N Afshar-Mohajer et al. Advances in Space Research 56 (2015) 1222-1241) or surface modification (A Dove et al. Planet. Space Sci. 59 (2011) 1784-1790) to reduce dust adhesion on protected surfaces. In contrast, active technologies use external forces to clean dust. These technologies include fluidal, mechanical, and electrostatic/electrodynamic methods. Fluidal and mechanical methods are relatively simple, for example applying compressed gas or brushing/vibration mechanisms.

Taking advantage of lunar dust being charged due to exposure to the solar wind plasma and solar radiation, electrodynamic/electrostatic methods use electrostatic forces to remove dust. These methods have attracted more attention in recent years. As the best known one, the Electrodynamics Dust Shield (EDS) technology has been extensively studied (R Sims et al. Proc. ESA—IEEE Joint Meet, Electrostat. (2003) 814-821; C Calle et al. IAC-06-A5.2.07 (2006), 2006; C Calle et al. J. Electrostat. 67 (2009) 89-92; C Calle et al. Acta Astronaut. 69 (2011) 1082-1088; KK Manyapu et al. Acta Astronaut. 137 (2017) 472-481; H Kawamoto et al. J. Electrostat. 94 (2018) 38-43). The idea of this technology is to apply oscillating multiphase high voltages on electrodes, which are embedded in or attached to an insulating surface to be cleaned, to generate traveling electric field waves to sweep charged dust off the surface. Electrostatic Lunar Dust Collector (ELDC) (N Afshar-Mohajer et al. AIAA 41st International Conference on Environmental Systems (ICES). (2011) http://dx.doi.org/10.2514/6.2011-5201; N Afshar-Mohajer et al. Adv. Space Res. 48 (2011) 933-942) and Electrostatic Lunar Dust Repeller (ELDR) (N Afshar-Mohajer et al. Aerosol Air Qual. Res. 14 (2014) 1333-1343; N Afshar-Mohajer et al. J. Aerosol Sci. 69 (2014) 21-31; N Afshar-Mohajer et al. Adv. Powder Technol. 25 (2014) 1800-1807), were demonstrated to prevent charged dust from accumulating on protected surfaces. Recently, an electrostatic dust attractor was developed using the photovoltaic effect of a lanthanum-modified lead zirconate titanate (PLZT) device. The device absorbs UV light to generate a high voltage between the attractor electrode and a conducting surface to clean dust from the surface (J Jiang et al. Acta Astronautica 165 (2019) 17-24; Y Lu et al. Smart Materials and Structures 28 (2019) 085010).

Figure 18:
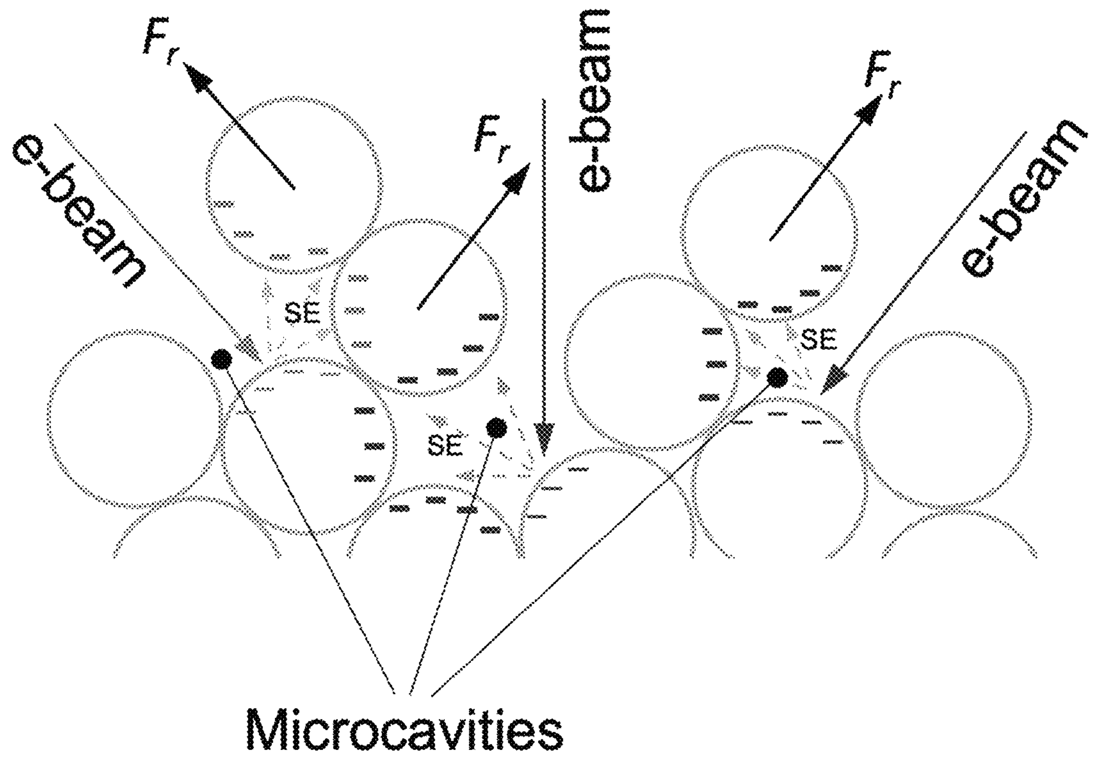
FIG. 18. Schematic of microcavity configurations in the Patched Charge Model (B Farr et al. Acta Astronautica 188 (2021) 362-366). The model shows that the re-absorption of secondary electrons induced by an e-beam within microcavities can cause large negative charge buildups on the surrounding dust particles and their ejections due to strong repulsive forces $F_r$ (X Wang et al. Geophys. Res. Lett. 43 (2016) 6103-6110). Due to randomness of microcavity orientations, variations of the beam angle allow more microcavities to be exposed, subsequently causing more dust to be removed.

The technologies described above all have advantages and disadvantages (N Afshar-Mohajer et al. Advances in Space Research 56 (2015) 1222-1241). There are currently no technologies that work for all mitigation scenarios. To fill the technology gap, an electron beam (e-beam) technology was recently developed and demonstrated to be effective and efficient to clean dust on surfaces in the lunar surface environment (B Farr et al. Acta Astronautica 177 (2020) 405-409; B Farr et al. Acta Astronautica 188 (2021) 362-366). This technology was based on a Patched Charge Model (X Wang et al. Geophys. Res. Lett. 43 (2016) 6103-6110; J Schwan et al. Geophys. Res. Lett. 44 (2017) 3059-3065). As illustrated in FIG. 18, secondary electrons are emitted when beam electrons hit dust particles, and a fraction of the secondaries are re-absorbed within microcavities between dust particles, resulting in buildups of large negative charges on the surrounding particles. Subsequently, strong repulsive forces between these negatively charged dust particles cause their ejection from the surface. FIG. 18 also shows that microcavities have random configurations and orientations, hence varying the e-beam incident angle on the surface can result in more microcavities to be exposed to the beam and subsequently causing more dust to be removed (B Farr et al. Acta Astronautica 188 (2021) 362-366). In previous experiments, a 10-30% increase was shown in the cleaning effectiveness when rotating the sample surfaces fully covered in dust relative to an e-beam source (B Farr et al. Acta Astronautica 188 (2021) 362-366). An equivalent alternative of (B Farr et al. Acta Astronautica 188 (2021) 362-366) is to have a rotating beam relative to a fixed sample surface to achieve the same cleaning results.

Herein, a new approach of varying the beam angle without rotating the beam or sample surface is presented and tested. This will offer another choice, when configuring an e-beam setup for the Moon. Here, three fixed e-beam sources were arranged at different angles, all pointed at a sample surface that was fixed in place. This configuration was tested for a large variety of sample materials, including both insulating and conducting samples, to demonstrate wide application scenarios for exploration systems. The experimental method and results are described below.

Figure 19:
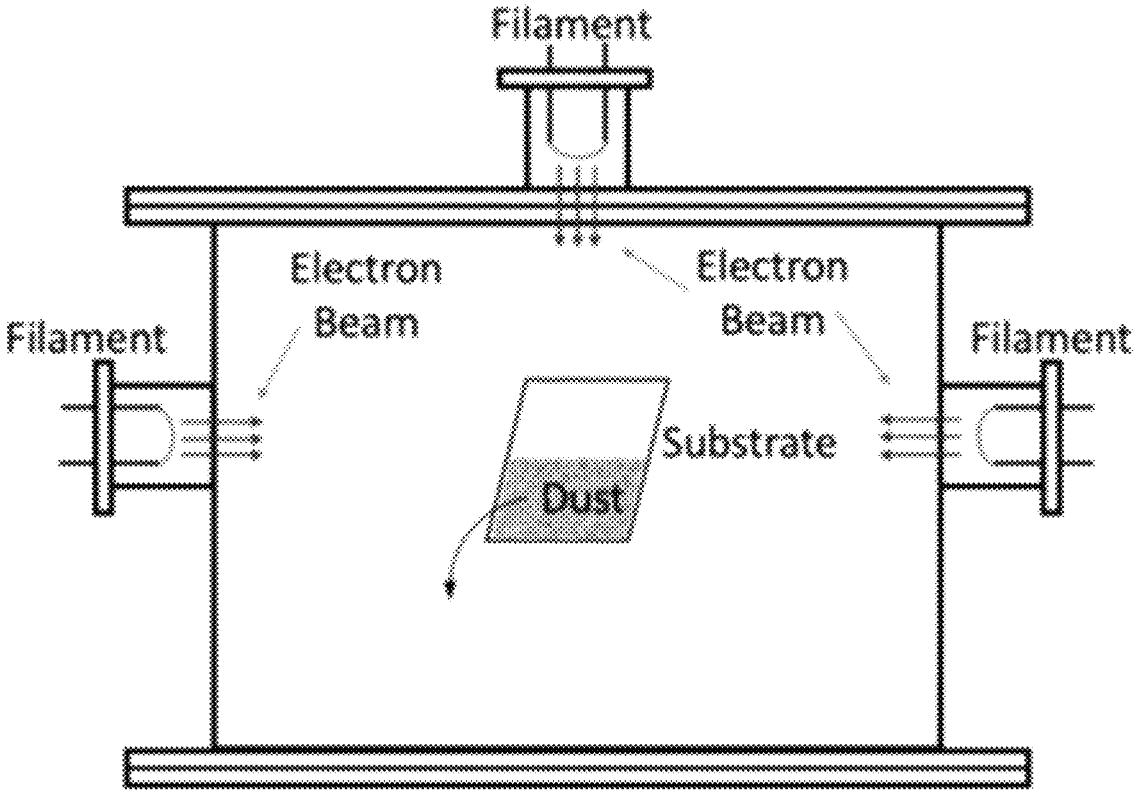
FIG. 19. Schematic of the experimental setup. Electron beams are generated using a negatively biased hot filament with a grounded grid located on the top and sides of the chamber. Samples are attached to a substrate and deposited with lunar simulant (JSC-1, <25 μm or 38-45 μm in diameter). A half of the surface area is not covered in dust and used for monitoring any lighting condition changes. For the spacesuit and photovoltaic panel tests, the substrate is attached to a shaft that is rotated at a rate of 6 rpm by a motor. A video camera is used to record cleanliness changes of the sample surfaces over the course of the cleaning process.
Figure 20:
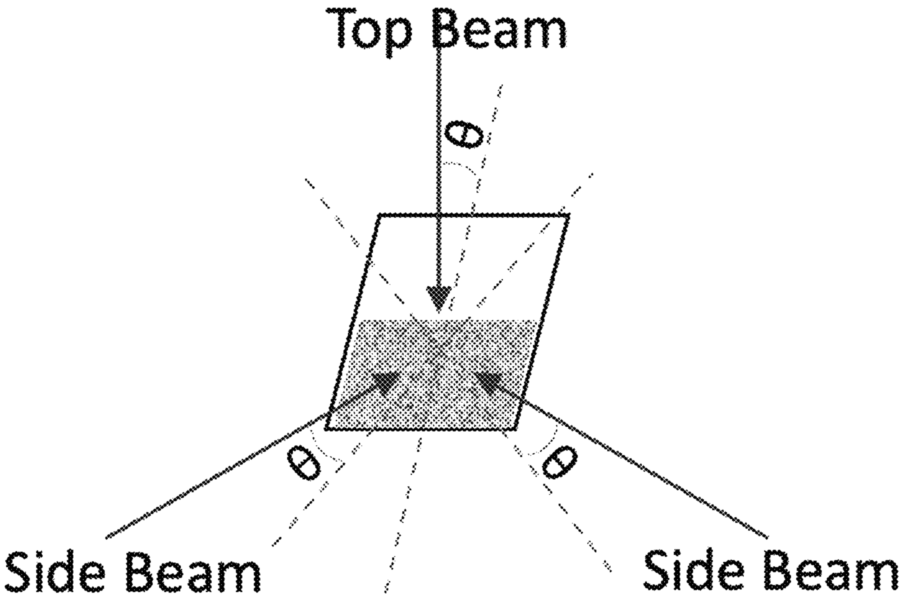
FIG. 20. Three beams aimed at the sample surface from the top and two side directions, each with an angle θ of ~45 degrees to the surface.

Experimental setup and method. FIG. 19-FIG. 20 shows a diagram of the experimental setup in a vacuum chamber, 50 cm diameter and 28 cm tall. JSC-1 lunar dust simulant (p $2.9\times10^3$ kg/m$^3$, either <25 or 38-45 μm in diameter) was used in the experiments. Dust particles were uniformly deposited on a test sample (2.5 cm×5 cm) attached to a substrate. A detailed deposition procedure is described in prior work (B Farr et al. Acta Astronautica 177 (2020) 405-409). Three e-beam sources were mounted on the top and sides of the chamber (FIG. 19) and aimed at the sample surface at ~45 degrees from three directions simultaneously (FIG. 20). Due to a wide range of dust lofting angles and velocities (A Carroll et al. Icarus 352 (2020) 113972; NC Orger et al. Advances in Space Research 68 (2021) 1568-1581), to clean a large surface area, the surface needs to be positioned at an angle relative to the horizontal position so that ejected dust particles fall back down to lower areas and follow the downward path to be cleaned. In this demonstration, the sample surface was positioned at 45 degrees to the horizontal position. Each beam source consisted of a negatively biased hot filament and a grounded grid and was ~20 cm from the sample surface, resulting in an approximately uniform beam spot 5-10 cm diameter on the sample surface (B Farr et al. Acta Astronautica 188 (2021) 362-366). The beam energy and current density of each source were 120 eV and 1.5 μA/$cm^2$ at the sample surface, which are the optimized parameters determined from the previous work (B Farr et al. Acta Astronautica 177 (2020) 405-409). The power consumption was mainly used for heating the filaments. The heating power of each filament was ~10 W (a total of ~30 W with three filaments) that can clean a surface area up to 80 $cm^2$ using the setup in this demonstration for only 2-3 minutes as shown below. The power consumption in practical applications is expected to be lower with improved designs of the beam source. A video camera was used to record the surface cleanliness as it changes throughout the cleaning process. Light was shone from two opposite sides of the chamber to minimize shadow effects caused by uneven dusty surfaces.

As defined in previous work (B Farr et al. Acta Astronautica 177 (2020) 405-409; B Farr et al. Acta Astronautica 188 (2021) 362-366), the surface cleanliness has an inverse relationship with the dust coverage of the sample surface (i.e., the higher cleanliness indicates the lower dust coverage). The surface cleanliness C is determined as:

$$C=(L_s-L_d)/(L_c-L_d)$$

where $L_s$ is the average pixel brightness of the sample surface during the cleaning process, $L_c$ is the average pixel brightness of the clean surface (no dust), and $L_d$ is the average pixel brightness of the surface fully covered by dust. All images were taken with same camera settings and lighting conditions. This cleanliness determination method was verified with the cumulative cross-section coverage of individual dust particles over the total analyzed surface area using microscopic images (B Farr et al. Acta Astronautica 188 (2021) 362-366). Each sample was initially covered in dust on half of the surface area, as shown in FIG. 21-FIG. 26. The uncovered half was used to monitor any change due to a lighting condition change during cleaning, which was corrected in the post-analysis for a consistent background.

A large variety of surface materials were tested, including both insulating (glass, spacesuit, a photovoltaic (PV) panel, thermal blanket, Kapton tape and anodized aluminum) and conducting (aluminum) samples. These materials are widely used on space exploration systems. The spacesuit material was Orthofabric (JR Gaier et al. NASA Technical Memorandum TM-2018-219923 (2018)) obtained in 2005 from Johnson Space Center. Among the six insulating samples that were tested, the first three were the same as in previous work (B Farr et al. Acta Astronautica 188 (2021) 362-366), to allow a comparison of results for the different setups (three beams and a fixed sample here versus a single fixed beam and a rotating sample in the previous work). Additionally for the spacesuit and photovoltaic tests, once the dust activity stopped, the sample was rotated at 6 rpm while exposed to the beams to examine any further cleaning as in previous experiments (B Farr et al. Acta Astronautica 188 (2021) 362-366). In this experiment, each material was tested with an initial cleanliness of 0% (i.e., full dust coverage). Each of the tests included 3 trials, and their averaged results are shown in FIG. 21-FIG. 26 with the standard deviations shown as error bars.

Figure 21:
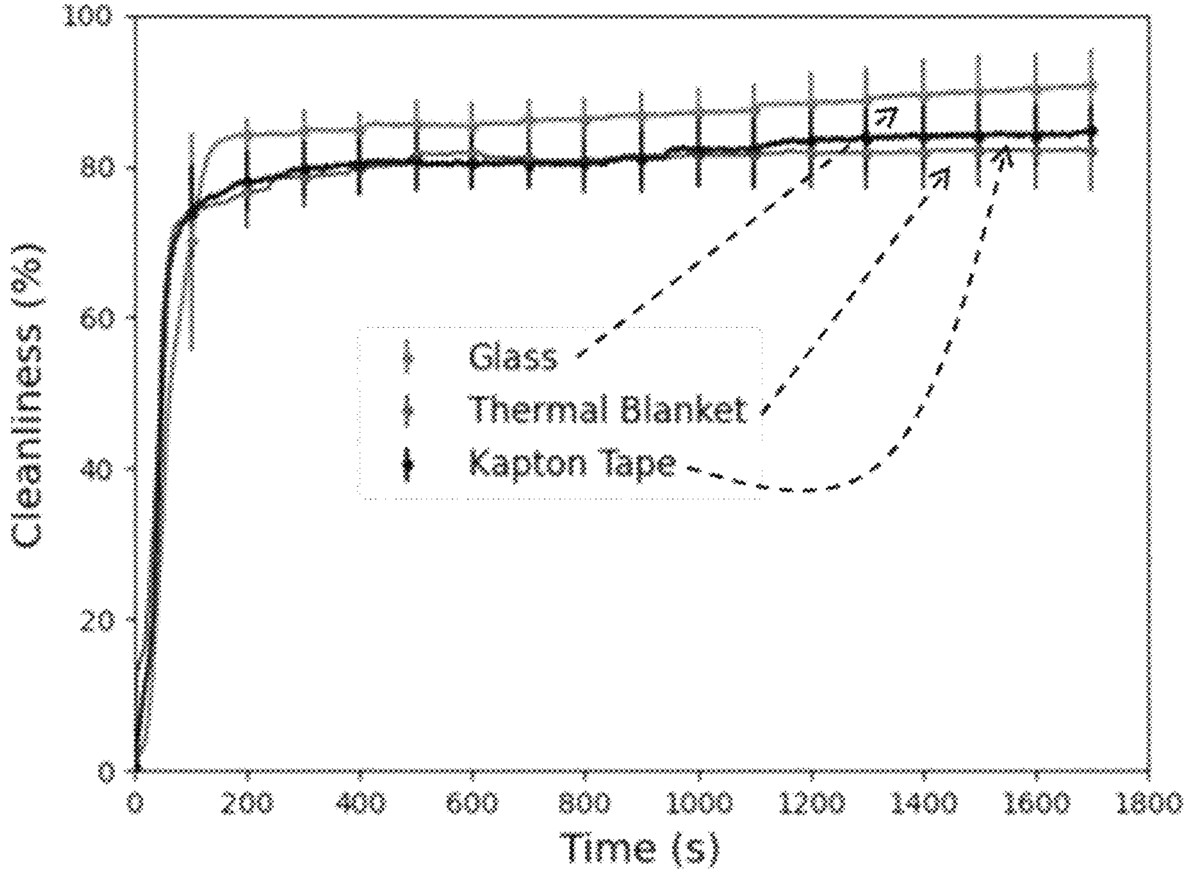
FIG. 21. The cleanliness as a function of time for the glass, thermal blanket, and Kapton tape samples with 0% initial cleanliness (full dust coverage, <25 μm dust).
Figure 22:
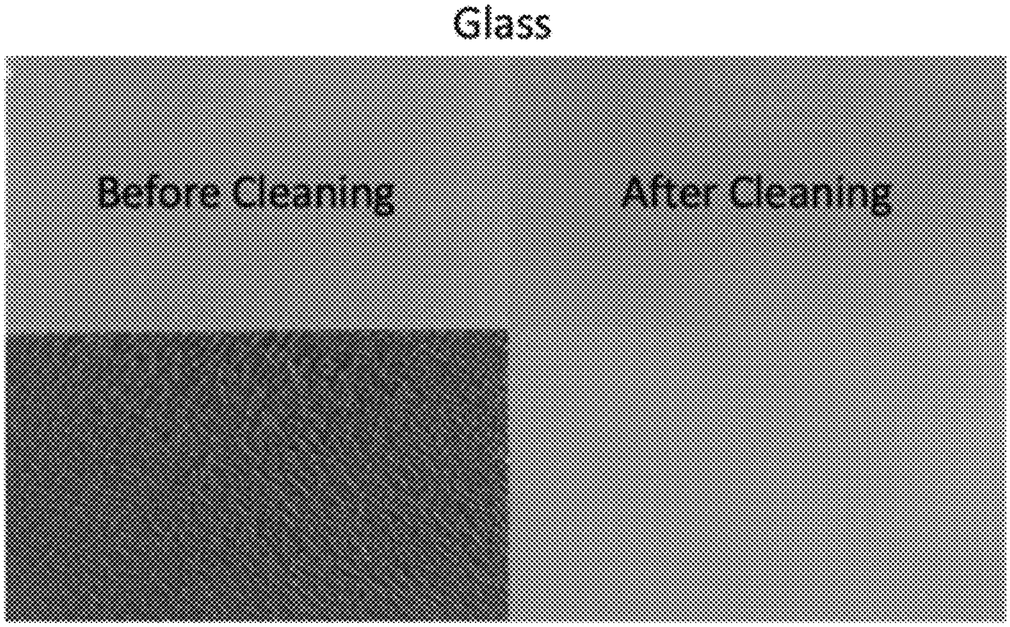
FIG. 22. Images of the glass sample before and after the e-beam cleaning process. The top half surface area is not covered in dust and used for monitoring any lighting condition changes.

Results. FIG. 21-FIG. 26 show the cleanliness as a function of time for each sample and before & after images of the cleaning. FIG. 21 shows that the glass, thermal blanket and Kapton tape samples reached the cleanliness of ~90%, 82% and 85%, respectively. All three samples were initially fully covered in <25 μm dust and the majority of the cleaning was done within ~3 minutes. The cleaning result for the glass sample is slightly better than the rotating sample result of ~85% cleanliness as shown in the prior work (B Farr et al. Acta Astronautica 188 (2021) 362-366).

Figure 23:
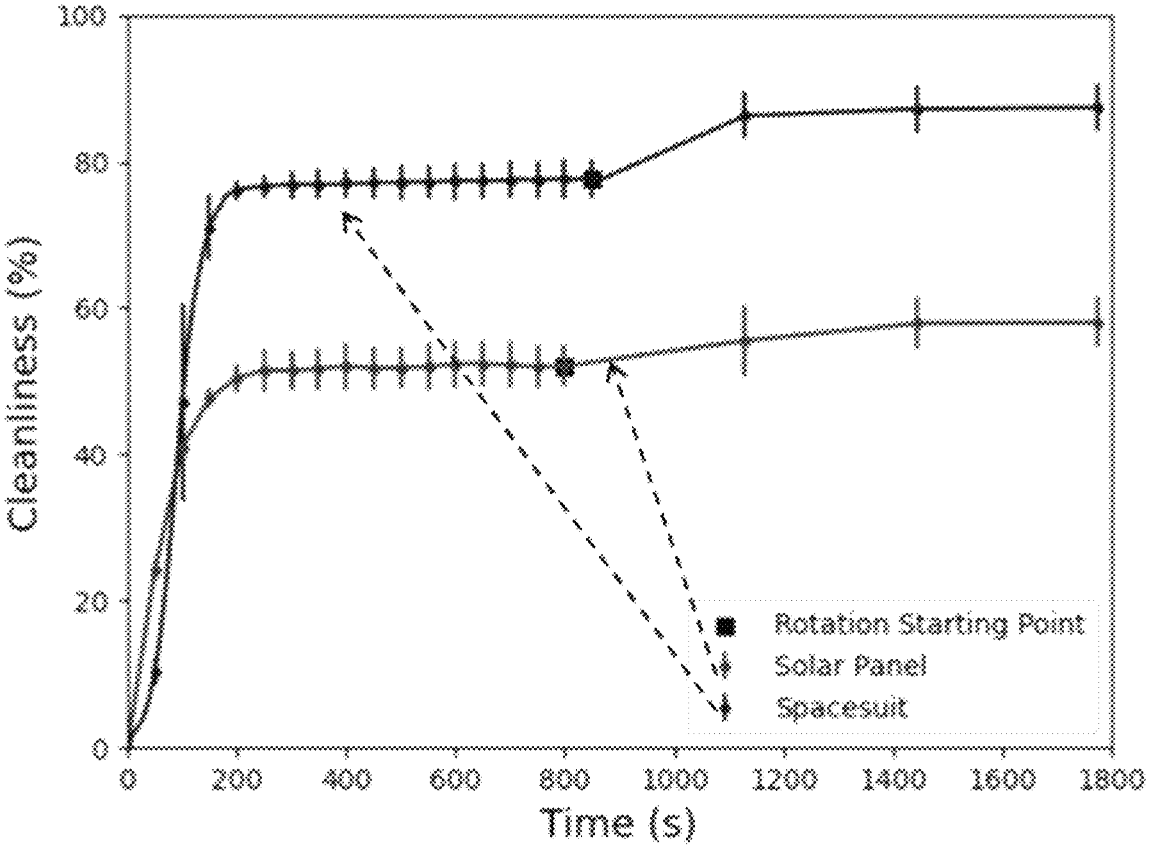
FIG. 23. The cleanliness as a function of time for the photovoltaic panel and spacesuit samples with 0% initial cleanliness (full dust coverage, <25 μm dust).
Figure 24:
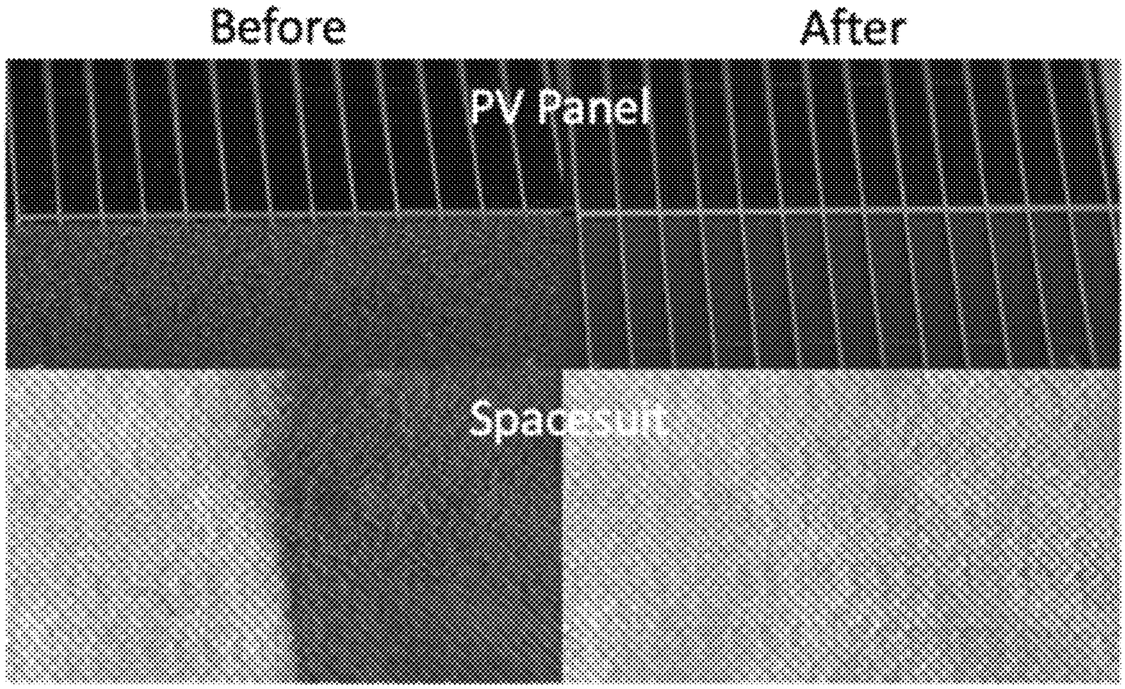
FIG. 24. Images of both the photovoltaic panel (Top) and spacesuit (Bottom) samples before and after the cleaning process. The uncovered surface areas are used for monitoring any lighting condition changes.

FIG. 23-FIG. 24 shows the results for the spacesuit and photovoltaic panel samples. The cleaning process for these was slightly different from the other materials. These samples were held stationary under the three beams until the dust activity stopped, and then they were rotated to expose at more beam incident angles. The initial conditions for these samples were the same as the other samples. The spacesuit and photovoltaic panel samples reached a cleanliness of ~78% and ~52%, respectively, which are close to the rotating sample results of ~83% and ~50% cleanliness as shown in the prior work (B Farr et al. Acta Astronautica 188 (2021) 362-366). Further rotation under the three beams increased the cleanliness to ~87% and ~58% for the spacesuit and photovoltaic panel, respectively. These results indicate that beam exposure with more incident angles increases the cleaning effectiveness. As described previously (B Farr et al. Acta Astronautica 188 (2021) 362-366), the relatively low cleanliness on the photovoltaic panel indicates that its outmost layer of $MgF_2$ is more adhesive to dust.

Figure 25:
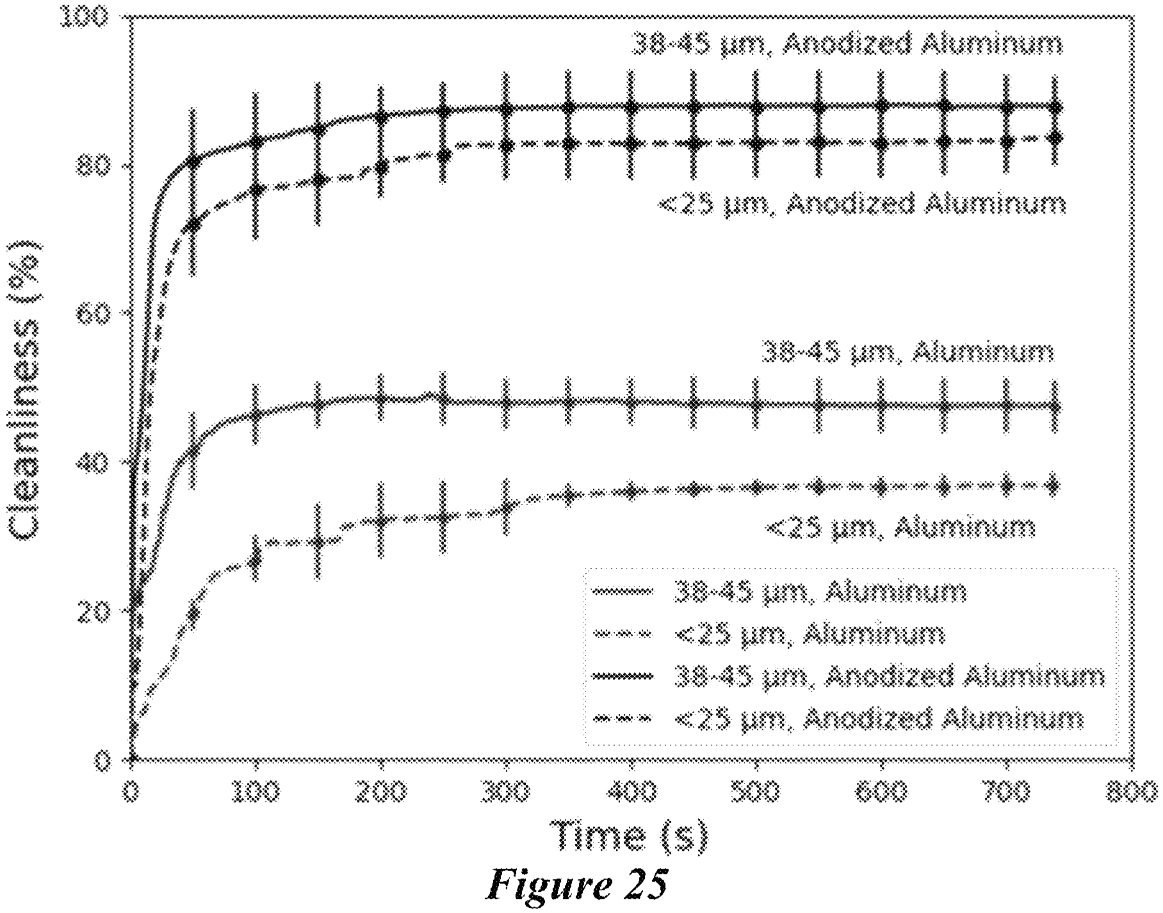
FIG. 25. The cleanliness as a function of time for the aluminum and anodized aluminum sample surfaces. Both <25 μm and 38-45 μm dust particles were tested for these materials.
Figure 26:
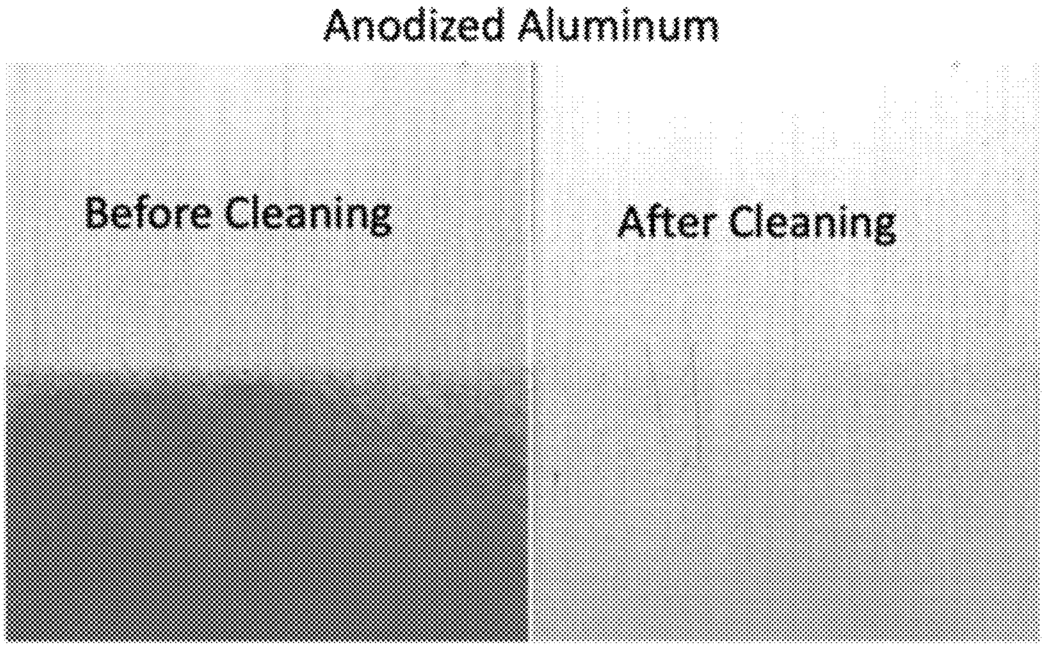
FIG. 26. Images of the anodized aluminum before and after the cleaning process. The top half surface area is not covered in dust and used for monitoring any lighting condition changes.

FIG. 25-FIG. 26 shows the results for the aluminum and anodized aluminum sample surfaces. Anodized aluminum has an insulating surface and aluminum is a conducting material. These samples were tested with two different sizes of lunar simulant dust, <25 μm and 38-45 μm diameters. It shows that the anodized aluminum surface with both dust sizes reached a cleanliness between 84-88%, which is as good as most of other testing insulating samples. The dust size effect on the cleaning effectiveness is relatively small, only 4%. However, the aluminum surface showed a much lower cleaning effectiveness. With the <25 μm simulant, the sample surface only reached a cleanliness of ~37% while it increased to ~48% with the 38-45 μm simulant. Such low cleaning effectiveness is likely attributed to the high conductivity of the aluminum surface. Dust particles charged by the e-beams create image charges with an opposite polarity on the aluminum surface, resulting in attractive Coulomb mirror forces between the dust particles and sample surface. This causes the dust particles to be more difficult to be removed. As the mirror force decreases with the distance between two charged particles, larger dust particles will have an increasing effective distance from their imaginary counterparts, resulting in decreased mirror forces. Therefore, larger dust is easier to be removed than smaller dust, in agreement with the results shown in FIG. 25-FIG. 26.

It is found that the new multiple-beam method with a fixed sample achieved about the same cleaning effectiveness as the method with a single beam and a rotating sample (B Farr et al. Acta Astronautica 188 (2021) 362-366). This result validates the finding that a sample can be cleaned efficiently, using e-beams, even when the sample is fixed. Furthermore, both methods achieved the cleaning effectiveness 10-30% higher than the original method with a single fixed beam and sample (B Farr et al. Acta Astronautica 177 (2020) 405-409). Note that the higher total beam current of the three beams slightly reduces the cleaning time and does not increase the ultimate cleaning effectiveness, as shown previously (B Farr et al. Acta Astronautica 177 (2020) 405-409). It therefore proves that the increase in cleaning effectiveness shown in this work is because more micro-cavities are exposed to the beams at different angles and subsequently more dust particles are removed, in support of the Patched Charge Model.

These results show that the e-beam method can effectively clean 80-90% of dust on most of the insulating materials. The remaining dust is mostly single layered dust that has direct contact with the sample surface. As described in the Patched Charge Model (FIG. 18), microcavities between dust particles play an important role in determining dust charging and ejection by repulsive forces. For single layered dust, microcavities are formed between the dust particles and sample surface. Such configurations might not be as effective as dust-dust microcavities (FIG. 18) for dust to be sufficiently charged and ejected. Additionally, due to gravity, the remaining layer of dust is compressed by the upper layer dust, resulting in better contact with the sample surface and subsequently larger adhesive forces to overcome for dust to be removed (X Wang et al. Geophys. Res. Lett. 43 (2016) 6103-6110; CM Hartzell et al. Geophysical research letters 40 (2013) 1038-1042; NC Orger et al. Advances in Space Research 63 (2019) 3270-3288).

Summary and discussion. The idea of the e-beam dust mitigation technology was based on the Patched Charge Model (X Wang et al. Geophys. Res. Lett. 43 (2016) 6103-6110), which shows that buildups of large charges due to e-beam induced secondary electrons within dust-dust microcavities can cause dust ejection due to strong repulsive forces. In previous work, it was shown that rotating the sample surfaces to vary the beam incident angle can improve the cleaning effectiveness (B Farr et al. Acta Astronautica 188 (2021) 362-366). Due to random orientations of the microcavities, variations of the beam incident angle cause more dust to be exposed to the beam, resulting in more dust to be removed.

In this work, an approach of varying beam angles was implemented with a configuration of multiple e-beam sources aimed at a sample surface at different angles simultaneously without rotating the beam or sample, providing another choice for different dust cleaning needs.

The cleaning performance was tested against six insulating surface samples (glass, spacesuit, photovoltaic panel, thermal blanket, Kapton tape, and anodized aluminum) and a conducting sample (aluminum) to examine the e-beam technology's application scenarios. Lunar simulant either <25 μm or 38-45 μm in diameter was deposited on the sample surfaces until fully covered (i.e., 0% initial cleanliness). The samples were at a fixed position exposed to the three e-beam sources until dust activity stopped. After that, additional rotation was tested for the spacesuit and photovoltaic panel.

Under exposure of the three beam sources, all the insulating samples showed high cleaning effectiveness with the final cleanliness reaching ~80-90% after only 2-3 minutes, except for the photovoltaic panel that had ~52% cleanliness. Rotating the spacesuit and photovoltaic panel resulted in an additional ~10% and ~6% cleanliness, respectively, indicating that beam exposure with more incident angles increases the cleaning effectiveness.

The aluminum sample surface had relatively low cleaning effectiveness with the final cleanliness of ~38% and ~48% for <25 μm and 38-45 μm diameter dust, respectively. In contrast, the anodized aluminum, which has an insulting surface, showed the much higher final cleanliness of 84-88%. The low cleaning effectiveness on the aluminum surface is likely due to the attractive Coulomb mirror force between the charged dust and its imaginary counterpart within the surface. This was consistent with the results showing larger dust particles are easier to be removed due to the decreased attractive imaging force. The e-beam technology can have less cleaning effectiveness for conducting materials.

Compared to the results shown in previous work (B Farr et al. Acta Astronautica 177 (2020) 405-409; B Farr et al. Acta Astronautica 188 (2021) 362-366), it is found that, as described by the Patched Charge Model (FIG. 18), varying the e-beam angle enhances the dust removal effectiveness, whether by the method with multiple beams and a fixed sample or the method with a single beam and a rotating sample (B Farr et al. Acta Astronautica 188 (2021) 362-366). Both methods show 10% to 30% cleaning improvements than the original method with a single fixed e-beam and sample (B Farr et al. Acta Astronautica 177 (2020) 405-409).

A series of works, including (B Farr et al. Acta Astronautica 177 (2020) 405-409; B Farr et al. Acta Astronautica 188 (2021) 362-366) and this work, suggest the following configurations to implement varying the beam angle for the efficient dust cleaning using the e-beam technology: 1) A fixed beam and rotating surface; 2) A rotating beam and fixed surface; 3) Fixed multiple beams at different angles and a fixed surface; and 4) Combination of all above. The selection of these configurations will depend on detailed application scenarios and cleaning requirements. E-beam devices or systems with various scales can be configured, for example a handheld device used by astronauts, a single beam source device rotated by a motor or rastered with electric deflection plates as in a cathode-ray tube, or a large system with multiple beam sources that are fixed or movable.

As indicated from previous work (B Farr et al. Acta Astronautica 177 (2020) 405-409; B Guo et al. Solar Energy Materials and Solar Cells 185 (2018) 80-85; H Kawamoto, J. Electrostatics 98 (2019) 11-16; H Kawamoto, J. Aerosp. Eng. 25 (2012) 470-473), the dust cleaning performance also depends on many other factors like dust loading mechanism and loading level as well as repeated operation. It was shown previously (B Farr et al. Acta Astronautica 177 (2020) 405-409) that the cleaning effectiveness is better for surfaces that are partially covered than fully covered in dust as demonstrated in this work. As demonstrated in previous work (B Farr et al. Acta Astronautica 177 (2020) 405-409; B Farr et al. Acta Astronautica 188 (2021) 362-366) and this work, no electrostatic discharge (ESD) event was observed during beam exposure. A caution still needs to be taken when using e-beam to clean surface areas near sensitive electronics to avoid beam current leakage into the electronics that may cause any damage though such risk is relatively small because the electronics operating on the lunar surface need to be well shielded from charged particles in the space environment.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method of cleaning a surface of a substrate having a layer of dust disposed thereon, the method comprising:

irradiating a first location of the layer of dust with an electron beam, wherein the electron beam has an energy of from 80 electron volts (eV) to 400 eV and a current density of from 0.1 microamperes per square centimeter ($\mu A/cm^2$) to 10 $\mu A/cm^2$;

wherein the layer of dust comprises a plurality of particles;

wherein the plurality of particles have an average particle size;

wherein the layer of dust has an average thickness that is from 1 to 40 times the average particle size;

wherein each of the plurality of particles has a balance of forces, the balance of forces comprising a cohesive force between neighboring particles, an adhesive force between each particle and the surface, a gravitational force, or a combination thereof;

wherein the layer of dust further comprises a first cavity defined by a first portion of the plurality of particles, said first portion of the plurality of particles comprising 3 or more particles;

wherein the first location includes the first cavity, such that the electron beam traverses at least a portion of the first cavity to irradiate a particle within the first portion of the particles, said particle being an irradiated particle;

wherein the first location comprises a plurality of first locations, the electron beam comprises a plurality of electron beams, and each of the plurality of electron beams independently has an angle of incidence relative to the surface of from 0° to 180°;

thereby inducing the irradiated particle to emit a plurality of secondary electrons;

wherein at least a portion of the plurality of secondary electrons traverse at least a portion of the first cavity and impinge two or more of the other particles within the first portion of particles to thereby generate a secondary charge on the two or more other particles;

wherein the secondary charge on the two or more other particles creates an electrostatic repulsive force between said particles;

wherein the electrostatic repulsive force is greater than or equal to the balance of forces, such that said particles are ejected from the surface.

2. The method of claim 1, wherein the average particle size of the plurality of particles is from 1 micrometer (microns, μm) to 140 μm.

3. The method of claim 1, wherein the electron beam has an energy of from 200 to 280 eV.

4. The method of claim 1, wherein the electron beam is provided by an electron beam source and the electron beam source is separated from the surface of the substrate by a distance of from 1 millimeter to 100 centimeters.

5. The method of claim 1, wherein the first location is irradiated for an amount of time of from 1 second to 10 minutes.

6. The method of claim 1, wherein 50% or more of the dust is ejected from the surface.

7. The method of claim 1, wherein the substrate comprises a metal, a semiconductor, an insulator, or a combination thereof.

8. The method of claim 1, wherein the substrate comprises at least a portion of a device used for robotic or human extraterrestrial exploration.

9. The method of claim 1, wherein the method further comprises neutralizing the charge of the surface after ejecting the particles from the surface.

10. The method of claim 1, wherein the electron beam has a current density of from 1.5 to 3 $\mu A/cm^2$.

11. The method of claim 1, wherein the electron beam has an energy of from 200 to 280 eV and a current density of from 1.5 to 3 $\mu A/cm^2$.

12. The method of claim 1, wherein the method further comprises pre-cleaning the surface of the substrate prior to irradiating the first location, wherein, prior to pre-cleaning, the surface of the substrate has a preliminary layer of dust disposed thereon, and wherein the pre-cleaning removes a portion of the preliminary layer of dust to form the layer of dust.

13. The method of claim 12, wherein pre-cleaning the surface of the substrate comprises brushing the surface of the substrate.

14. The method of claim 1, wherein the method further comprises:

irradiating a second location of the layer of dust with the electron beam;

wherein the layer of dust further comprises a second cavity defined by a second portion of the plurality of particles, said second portion of the plurality of particles comprising 3 or more particles;

wherein the second location includes the second cavity, such that the electron beam traverses at least a portion of the second cavity to irradiate a particle within the second portion of the particles, said particle being a second irradiated particle;

thereby inducing the second irradiated particle to emit a plurality of secondary electrons;

wherein at least a portion of the plurality of secondary electrons traverse at least a portion of the second cavity and impinge two or more of the other particles within the second portion of particles to thereby generate a secondary charge on the two or more other particles within the second portion of particles;

wherein the secondary charge on the two or more other particles of the second portion of particles creates an electrostatic repulsive force between said particles;

wherein the electrostatic repulsive force is greater than or equal to the balance of forces, such that said particles are ejected from the surface.

15. The method of claim 14, wherein the substrate is translocated to illuminate the second location, wherein the electron beam is provided by an electron beam source and the electron beam source is translocated to illuminate the second location, or a combination thereof.

16. The method of claim 14, wherein the second location is irradiated for an amount of time of from 1 second to 10 minutes.

17. The method of claim 1, wherein the method is performed in an extraterrestrial environment.

18. The method of claim 17, wherein the method is performed on an airless planetary body.

19. The method of claim 18, wherein the dust comprises lunar regolith.

20. A device configured to perform the method of claim 1, wherein the device comprises:

an electron beam source configured to provide the electron beam;

a means for translating the substrate, the electron beam source(s), or a combination thereof.

* * * * *